US012579906B2

(12) United States Patent
Johnson et al.

(10) Patent No.: US 12,579,906 B2
(45) Date of Patent: Mar. 17, 2026

(54) BRAILLE WRITING DEVICE

(71) Applicants: Hilary Anna Johnson, Portland, OR (US); Vadim Kuklov, Somerville, MA (US); Alexander H. Slocum, Bow, NH (US)

(72) Inventors: Hilary Anna Johnson, Portland, OR (US); Vadim Kuklov, Somerville, MA (US); Alexander H. Slocum, Bow, NH (US)

( * ) Notice: Subject to any disclaimer, the term of this patent is extended or adjusted under 35 U.S.C. 154(b) by 442 days.

(21) Appl. No.: 18/108,466

(22) Filed: Feb. 10, 2023

(65) Prior Publication Data

US 2023/0260425 A1      Aug. 17, 2023

Related U.S. Application Data

(63) Continuation of application No. 16/900,784, filed on Jun. 12, 2020, now Pat. No. 11,580,880, which is a continuation-in-part of application No. 16/016,597, filed on Jun. 23, 2018, now Pat. No. 11,373,549.

(60) Provisional application No. 62/523,882, filed on Jun. 23, 2017.

(51) Int. Cl.
| | |
|---|---|
| *G09B 21/02* | (2006.01) |
| *B41J 3/32* | (2006.01) |
| *B41J 3/38* | (2006.01) |
| *B65C 11/02* | (2006.01) |
| *G09F 3/10* | (2006.01) |
| *G09F 3/02* | (2006.01) |

(52) U.S. Cl.
CPC ................ *G09B 21/02* (2013.01); *B41J 3/32* (2013.01); *B41J 3/382* (2013.01); *B65C 11/0247* (2013.01); *G09F 3/10* (2013.01); *G09F 2003/0208* (2013.01)

(58) Field of Classification Search
CPC ............................ B65C 11/0247; G09B 21/02
USPC ......................................................... 434/115
See application file for complete search history.

(56) References Cited

U.S. PATENT DOCUMENTS

| | | | | |
|---|---|---|---|---|
| 637,220 | A | * 11/1899 | Wellington | ................ B41J 3/39 400/24 |
| 3,837,456 | A | 9/1974 | Ruskin | |
| 4,079,825 | A | * 3/1978 | Fewell | ........................ B41J 3/32 400/109.1 |
| 4,215,490 | A | * 8/1980 | Fewell | ................. G09B 21/003 434/114 |
| 4,325,302 | A | * 4/1982 | Beers | .................. B65C 11/0247 101/316 |
| 5,636,565 | A | 6/1997 | Lawrance et al. | |
| 6,247,400 | B1 | 6/2001 | Litschel et al. | |
| 11,373,549 | B2 | 6/2022 | Johnson et al. | |
| 2005/0088417 | A1 | 4/2005 | Mulligan | |

* cited by examiner

*Primary Examiner* — Thomas J Hong

(57) ABSTRACT

Braille writing devices and systems, and corresponding methods of writing braille characters on a tape medium are described herein. The devices and systems emboss tactile dots on different types of tape medium to enable braille character writing and advance the tape medium to create accurate and repeatable spacing of the braille characters. The devices and systems may be comprised of simply molded plastic parts that snap together using elastically averaging precision alignment features.

5 Claims, 20 Drawing Sheets

60a
60f
60b
60e
60c
60d
64
61

63a
62a
64
62b
62c
62d
62e
63b
62f
63d
63c

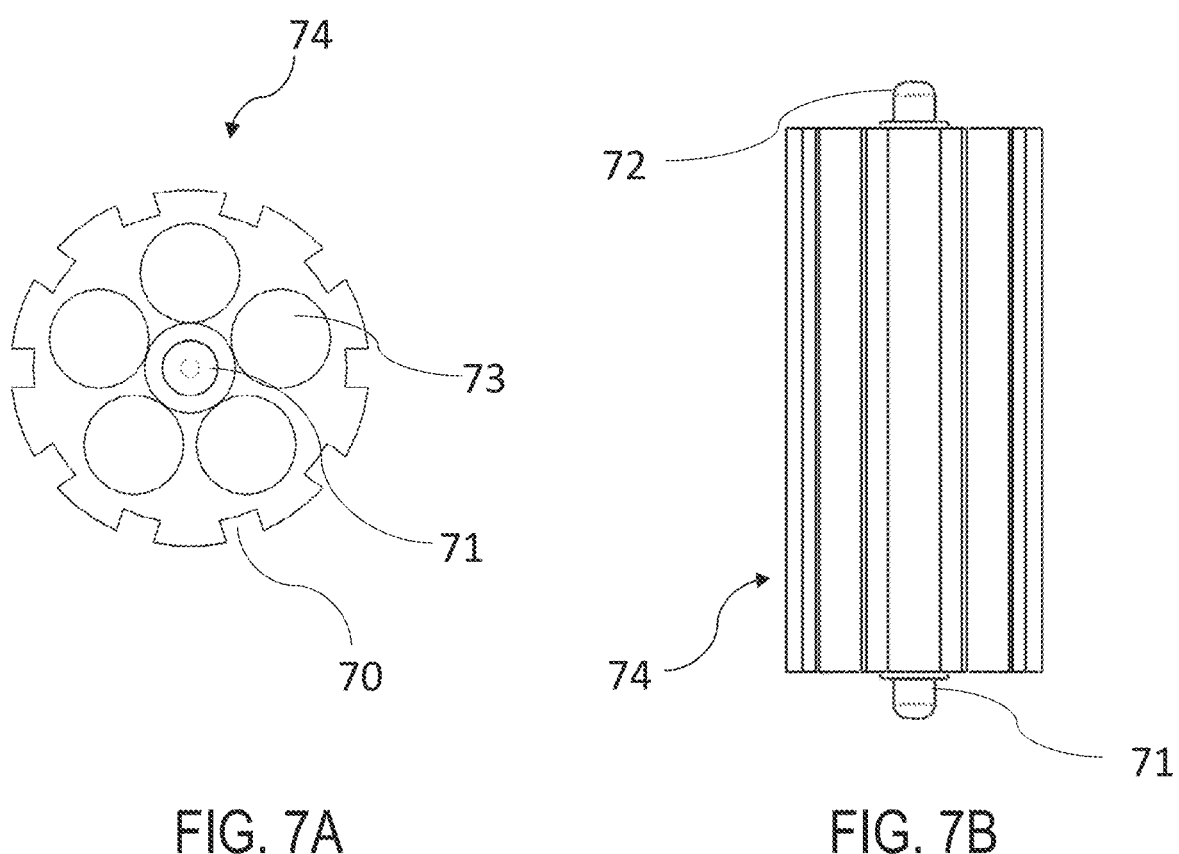
FIG. 7A                           FIG. 7B
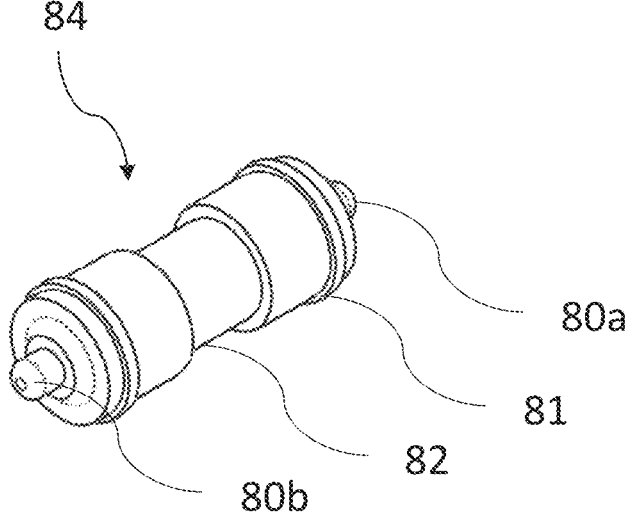
FIG. 8

BRAILLE WRITING DEVICE

CROSS-REFERENCE TO RELATED APPLICATIONS

This application is a continuation of U.S. patent application Ser. No. 16/900,784, filed on Jun. 12, 2020, which is a continuation-in-part of U.S. patent application Ser. No. 16/016,597, filed Jun. 23, 2018, entitled "BRAILLE WRITING DEVICE," which claims the benefit of U.S. Provisional Patent Application No. 62/523,882, filed on Jun. 23, 2017, entitled "Braille Writer for the Visually Impaired." The entire disclosures of the aforementioned patent applications are incorporated herein by reference.

BACKGROUND OF THE INVENTION

Braille script is a means by which many people with blindness and visual impairment read and write. While reading braille is simply done by moving the tips of the fingers over raised script, writing braille requires the use of tools or devices to emboss small dots in accordance with a standard shape, height, spacing between the dots within a braille cell, and consistent spacing between the cells.

Braille script is not a language in of itself, instead it is a code that can be associated or mapped onto the letters or characters within any written language, including alphabet letters, numbers, and punctuation marks. Within many languages, there are three grades of braille. Grade 1 is a letter by letter transcription useful for early learning and basic literacy. Grade 2 uses a single cell to represent a whole word or phrase, including abbreviations and contractions, which is useful for shortening messages and reading more efficiently. Grade 3 is less common and is comprised of non-standardized personal shorthand. There are also special braille codes for math and music.

Although braille literacy is correlated with higher employment rates and greater independence, one of the barriers to entry for reading and writing braille is the lack of effective and accessible technology available to people with blindness to independently write braille. Some might argue that braille technology is unnecessary with more accessible tools for audible learning, but just as sighted people learn and communicate through numerous modes including visual, oral, auditory, and written, people with blindness want and need access to the same opportunities to learn effectively. Furthermore, written labels are essential for people to independently identify many objects including, but not limited to: food packaging, medications, containers, drawers, desk supplies, folders and papers, maps and diagrams, household objects, and buttons on appliances. Braille labels on these objects allow persons with blindness to live more independently.

There are a number of braille writers that are used by persons with blindness, but a gap analysis of the state of the art shows that there is no label maker that is inexpensive, yet durable, easy to use, and can be used for any of the more than 130 braille languages globally. The lowest cost, commonly used device in both the United States and the developing world for writing braille is a slate and stylus, U.S. Pat. No. 3,340,625A. The slate and stylus require users to meticulously decide and feel each dot location, place the stylus, and then press the dot. Further, the slate and stylus require the user to write mirrored from the way they would naturally read, making it difficult to learn how to use. Other braillers, like the Perkins Brailler®, are braille typewriters with six keys that individually emboss each dot in the cells on sheets of paper. Because these braillers are expensive and heavy, they are most often found in schools, but not commonly used in daily life.

Developments in technology have led to digital braille writers that convert text to braille, allow users to type messages, and navigate applications and webpages, but these devices do not meet the need for braille tangibly realized in environments and connected to objects. The reason for the expense of these devices, among many, are that it is functionally difficult to meet the precision and repeatability requirements of braille writing, often requiring complex mechanical electrical systems with numerous actuators and specialized tape medium. Thus, the current state of the art devices and tools for writing braille do not meet the cost, efficiency, and accessibility requirements of the blind, particularly those living in developing countries on small incomes, thus motivating the design of this braille writer to meet these functional requirements.

SUMMARY

The subject matter claimed and described herein relates to a device that embosses tactile dots on tapes of different materials including plastic and paper to enable braille writing and labeling.

In one implementation, a handheld device to enable a person to easily create impressions in adhesive tape to enable a person to read a Braille message is described and provided herein. The device includes a hollow base structure, graspable by a person's hand, with a tape exit port located adjacent to a cutting edge, and a top region with flexurally hinged embossing arms whose tips converge to a central region, where the tips have downwardly projecting convex bump structures located above concave bump receiving structures, and a tape holding structure onto which a roll of tape can be placed whereby tape coming from the roll can pass between the convex and concave bump structures and over the cutting edge and out the tape exit port.

Further, the device can have a cover structure with flexurally hinged members, with concave fingertip receiving depressions, located above and coupled to the hinged embossing arms with snap domes to provide an audible click and tactile cue when the flexurally hinged members are pushed down on by a user's fingers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings, in which:

FIG. 7A shows a side view of a ratchet drum of an example device in accordance with an implementation of the present concepts.

FIG. 7B shows a top-down view of a ratchet drum of an example device in accordance with an implementation of the present concepts.

FIG. 8 shows a perspective view of a tape roller of an example device in accordance with an implementation of the present concepts.

DETAILED DESCRIPTION

Figures 1A, 1B:
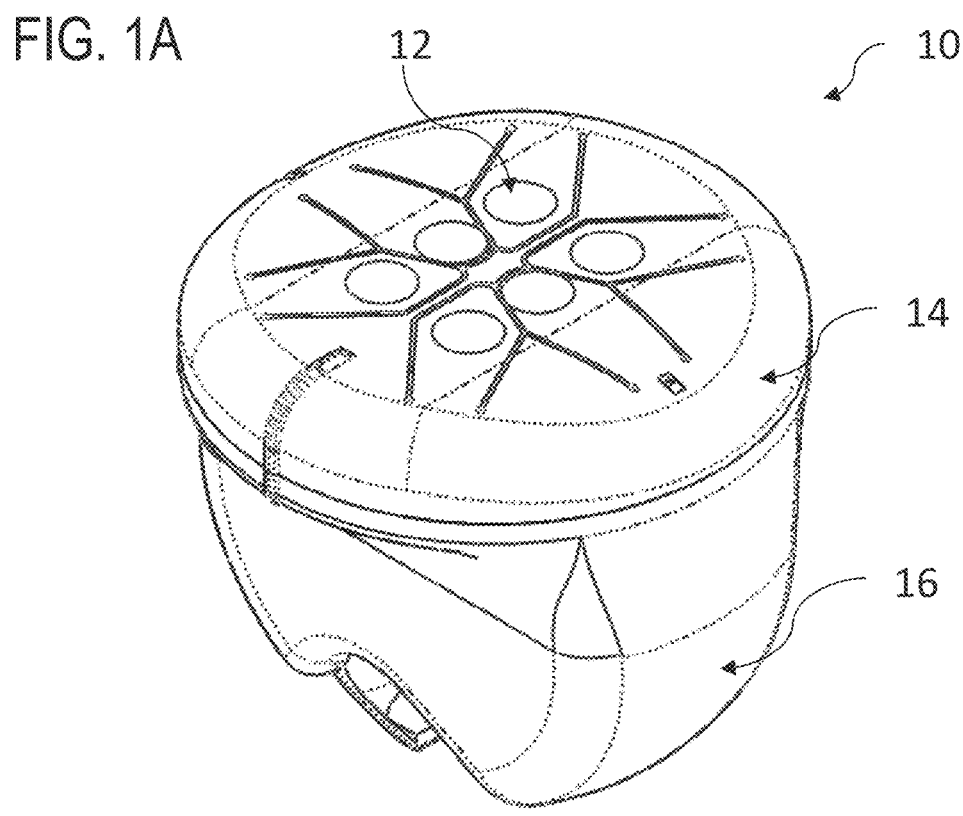
FIG. 1A shows a perspective view of an assembled example device in accordance with an implementation of the present concepts.
FIG. 1B shows a side view of an assembled example device in accordance with an implementation of the present concepts.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

The subject matter claimed and described herein relates to a device that embosses tactile dots on tapes of different materials including plastic and paper to enable braille writing and labeling. A principal object of this invention is to provide a new and improved handheld device for writing braille onto a medium. In addition, it is desirable to enable greater accessibility for the blind and visually impaired.

This disclosure generally relates to devices, systems, and methods for a braille writer. More particularly, this disclosure generally relates to the mechanisms combined to form a braille writing device that provides improved structures and mechanisms for creating braille impressions, such as braille dot combinations, and messages on a surface or medium. This disclosure is also related to providing the same to create accurate and repeatable spacing of the braille characters.

A further object of this invention is to provide, in some implementation, a braille writing device that may be constructed using simple molded plastic parts that have no need for side pulls in their molds. Alternatively, the braille writing device may be constructed using molded plastic parts that snap together. Elastically averaged precision alignment features may be used for manufactured parts that snap together.

In overview, the implementations described below are about a device including a mechanism for inputting Braille letters such that these letters are embossed or impressed on a medium and an advancement mechanism is used to move the medium forward for additional character input or removal of the medium. This device is typically handheld, although some implementations allow for resting of the device on a surface. In some implementations, the mechanism for inputting Braille letters may include finger depressible arms or paddles that interact with a mechanism that presses on and embosses the medium. These arms or paddles may, in some implementations, also provide haptic feedback to the user. The mechanism that embosses the medium may include any mechanism, which can provide precise pressure to the medium such that it forms Braille bumps but does not tear or otherwise ruin the medium. When it is desired that another character would like to be entered/embossed, an advancement mechanism is used to move the medium forward such that the embossing mechanism will not overwrite the previously completed character. Once character or letter entry is complete, the user may remove the medium, either manually or using the advancement mechanism. The advancement mechanism may be configured as a circular dial with ratchet notches that engage with a pawl to permit movement of the tape medium by the width of a single braille letter for each advancement request. The device may also have a tape medium cutting mechanism.

The device, in at least one implementation, is comprised of embossing arms in the form of six tapered beams with small dots at the tips of the beams. The tips are designed to precisely and repeatedly create impressions onto a tape (or similar) medium. The tape medium may include a variety of materials (plastic, polymer, paper, metal, or a combination thereof) and may include an adhesive. Underneath the embossing arms is a structurally stable embossing platform or anvil with small concave cups. The cups are aligned with the tip of the beams and mate with the tips when force is applied to the beam to cause a depression on the tape medium between the cups and tips. The beams and embossing platform parts are connected such that the beams can be repeatedly and precisely removed and reattached while maintaining accurate alignment.

The embossing platform or anvil is integrated with a tape holder (although these could be separate) and an indexing mechanism. One example of the indexing mechanism spaces braille cells using a ratchet drum and pawl to provide haptic feedback in the form of a tactile and/or auditory click when the tape medium is advances.

On top of the embossing arms is a top button cap that provides ergonomically spaced, flexural beam buttons for transferring the force necessary at the tip of the beams to emboss the tape medium. The top button cap may be configured to include a downward protruding column underneath each curved cantilevered beam button. The downward protruding column interfaces (or contacts) a small platform on top of the tapered embossing beams, transmits the press force to emboss the dot, and slips off the platform after the dot is created, creating a click haptic feedback for the user. The small platform may be configured to be or include a snap dome, which is a bi-stable piece of metal that changes its domed shape when a certain amount of force is applied. In addition to the dome deforming or flattening, the dome may make an audible sound before returning to its original shape after removal of the force.

Due to the precision required for the beams to connect with the embossing platform, providing repeatable and accurate dots, the present disclosure identifies and utilizes optimized geometry for beam bending and deflection. These mechanical elements are often called flexures and are advantageous in this design because all six beams can be injection molded in a single piece without need for joints, or connections, limiting assembly error. Further, the use of elastic averaging features to connect the embossing beams with the body of the device and with the ergonomic buttons averages translational and rotational errors. Elastic averaging contrasts with exact constraints. Exact constraint designs minimize points of contact between components such that the number of points of contact equal the degrees of constraint. Exact constraint designs achieve precision by precisely connecting components with the minimum number of points of contact and avoiding over-constraint. On the other hand, the principle of elastic averaging utilizes extreme over-constraint with many points of contact to achieve a precision connection by designing each contact point with flexibility, elasticity, and stiffness such that the contact point can deform or bend. When all the points of contact can deform, the position of the overall connection mechanically averages to the precise location.

Precise alignment between the convex tip or bump structures of the embossing arm structure and the concave cup or bump structures of the embossing anvil is required to reliably form the Braille dots. For precise alignment and connection between embossing arm structure and the embossing anvil, it is preferable to manufacture these components as a single monolithic part, which could be done using additive manufacturing. Alternatively, the embossing arm structure and embossing anvil or platform may be injection molded as separate components. However, errors may be introduced during the injection mold manufacturing process (e.g., geometric errors from manufacturing the embossing arm structure, embossing anvil, and elastic averaging connector between the two components) that may be additive to load-induced errors (e.g., Abbe and cosine errors) from bending the beams of the embossing arm structure. As such, to reduce error and misalignment between the beams, the six embossing beams of the embossing arm structure may be form in a monolithic part. Thus, the precise alignment between the embossing arm structure and embossing anvil components may be achieved by using elastic averaging connectors.

Finally, the arrangement of the components of the device allows for a small handheld form factor, and uses the orientation of the natural stickiness of the tape medium as well as a capstan force to roll the ratchet drum and advance the tape medium to create space between embossed characters, while keeping the tape medium from sticking to the embossing platform.

An example implementation will now be described in detail in conjunction with the drawings.

FIG. 1A shows a perspective view and FIG. 1B shows a side view of an example implementation of the disclosed device 10. Device 10 is made of an injection moldable thermoplastic material, as described herein. In other example implementations, the device 10 is made of plasti-cally deformable metal or other resilient metal material.

Device 10 may be configured in a single piece or config-ured with multiple components. One or more components of the implementations described herein may be provided in a kit. In an implementation, as shown in FIGS. 1A and 1B, device 10 may be comprised of a top cap 14 and a base structure 16, both of which comprise a housing. In some implementations, the top cap 14 and base structure 16 may be one structure while in others they may be separate. The top cap 14 may be further comprised of flexural buttons or button arms 12 for transferring embossing force. For example, device 10 of FIGS. 1A and 1B may be provided with component portions shown in FIG. 2.

Figure 2:
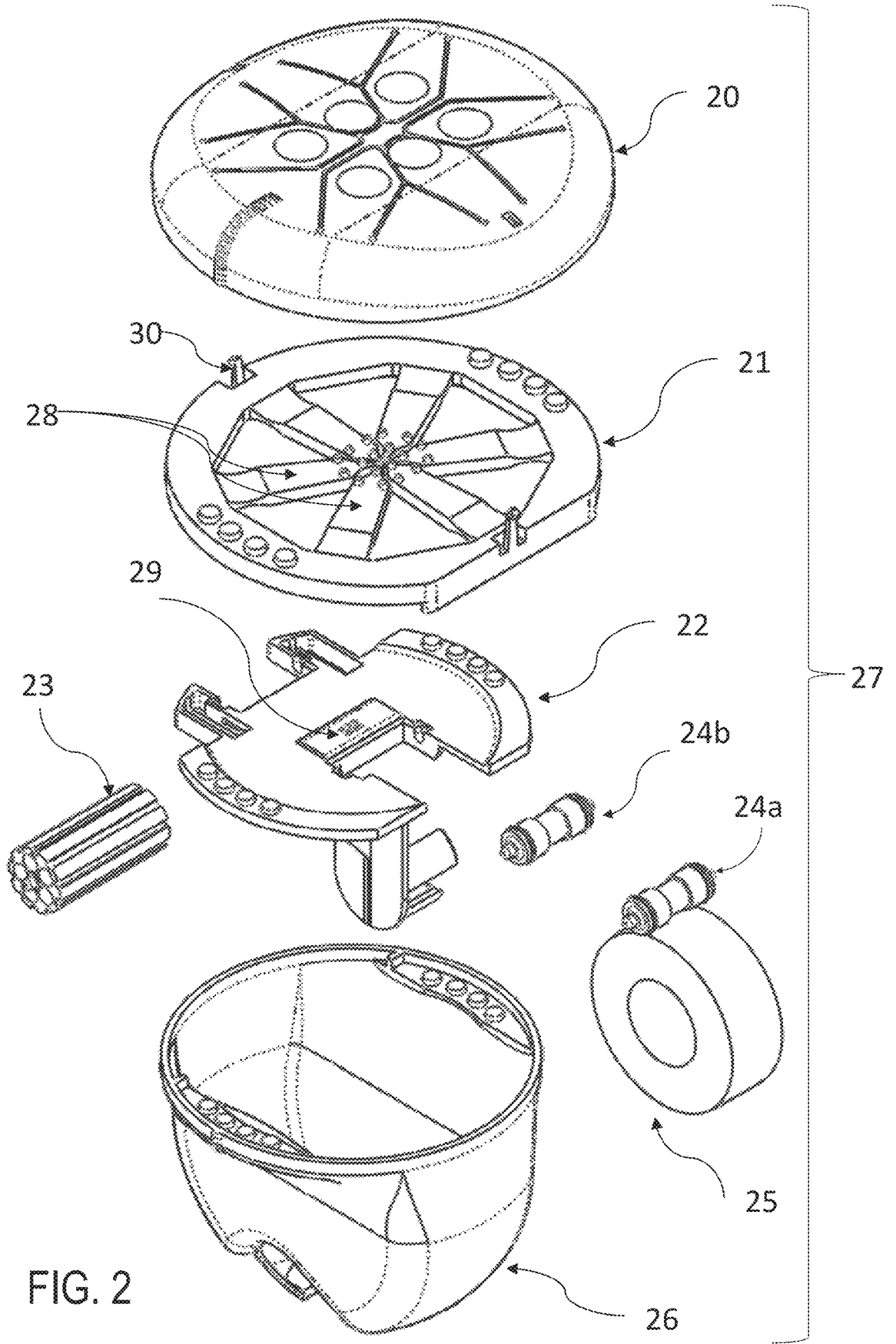
FIG. 2 shows an exploded perspective view of an example device in accordance with an implementation of the present concepts.

FIG. 2 illustrates an exploded perspective view of an example implementation of device 27. In an example, device 27 has a top cap 20 and a ring embossing arm structure 21, which are separate components. The ring embossing arm structure 21 is further comprised of a plurality of tapered beams 28 and alignment elements. The alignment elements guide and orient assembly of top cap 20 and ring embossing arm structure 21 into a single component that couples to the base structure 26. In some implementations, the top cap 20 and ring embossing arm structure 21 may be configured as a single unified component.

The base structure 26 is comprised of a tape handling structure 22, a ratchet drum 23, tape handling rollers 24a and 24b, and a tape medium roll 25. The tape handling structure 22 is further comprised of an embossing platform 29.

Figure 3A:
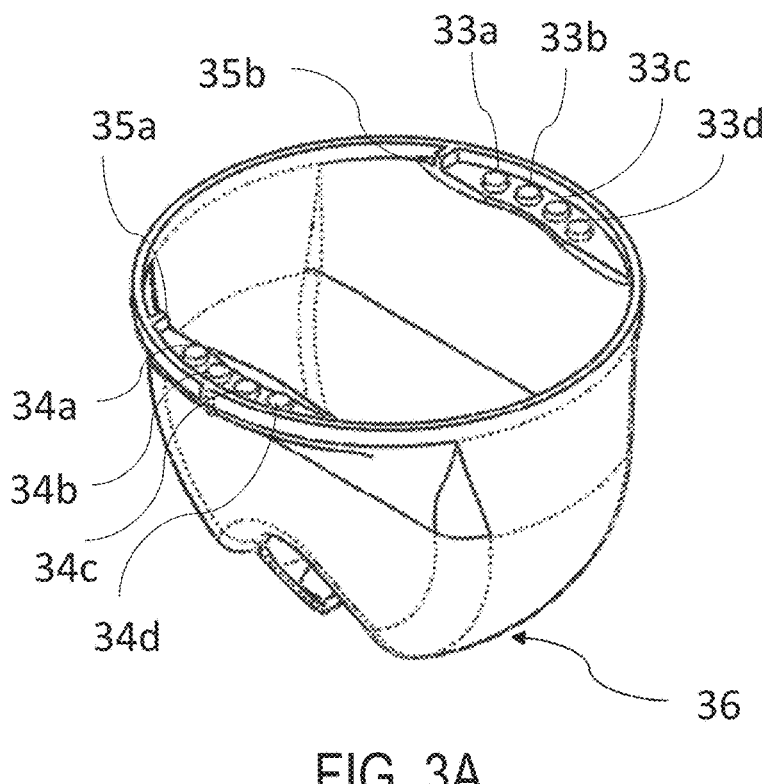
FIG. 3A shows a perspective view of a base structure of an example device in accordance with an implementation of the present concepts.
Figure 3B:
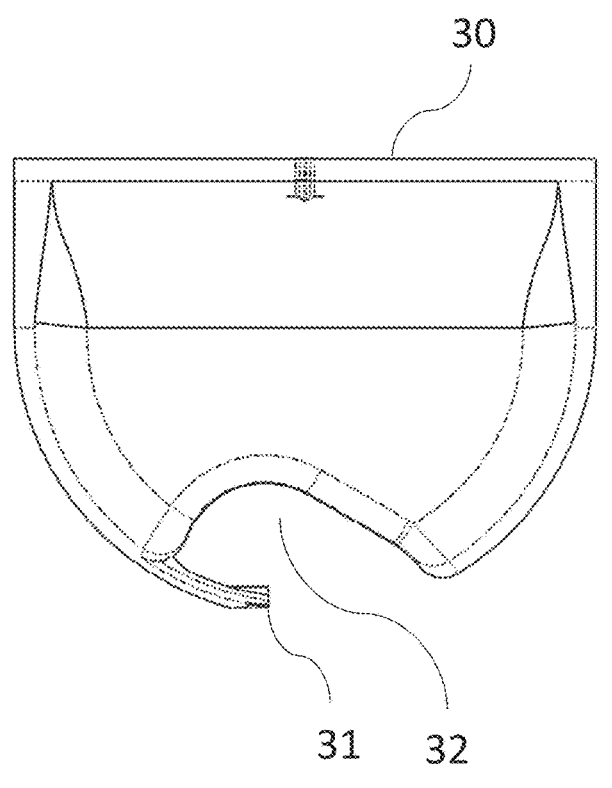
FIG. 3B shows a side view of a base structure of an example device in accordance with an implementation of the present concepts.

FIG. 3A and FIG. 3B illustrate perspective and side views of base structure 36. In some implementations base structure 36 is comprised of a receiving region 30, a cutting edge 31, a tape exit port 32, and a plurality of alignment features 33a, 33b, 33c, 33d, 34a, 34b, 34c, 34d, 35a, and 35b. In an implementation, cutting edge 31 may be configured as a blade or a serrated surface disposed on an edge of tape exit port 32. The cutting edge 31 may further be aligned with the tape medium to allow for manual cutting of the tape medium by a user of the device 10. In some implementations, the plurality of alignment features corresponds to and engage with complementary alignment features on the ring emboss-ing arm structure 21. The alignment features can limit or prevent the movement of the top cap 20, ring embossing arm structure 21, and base structure 36 relative to one another during use or transport of the device 10 of FIG. 1A. Other alignment features may be used in other implementations. For example, self-alignment tabs extending from the top cap 20 or ring embossing arm structure 21 into slots sized to match each tab may be used for coupling the base structure 36 to the top cap 20 and embossing arm structure 21. In yet another implementation, the base structure may be config-ured to receive alignment dowels extending from the top cap 20 or ring embossing arm structure 21.

Figure 4A:
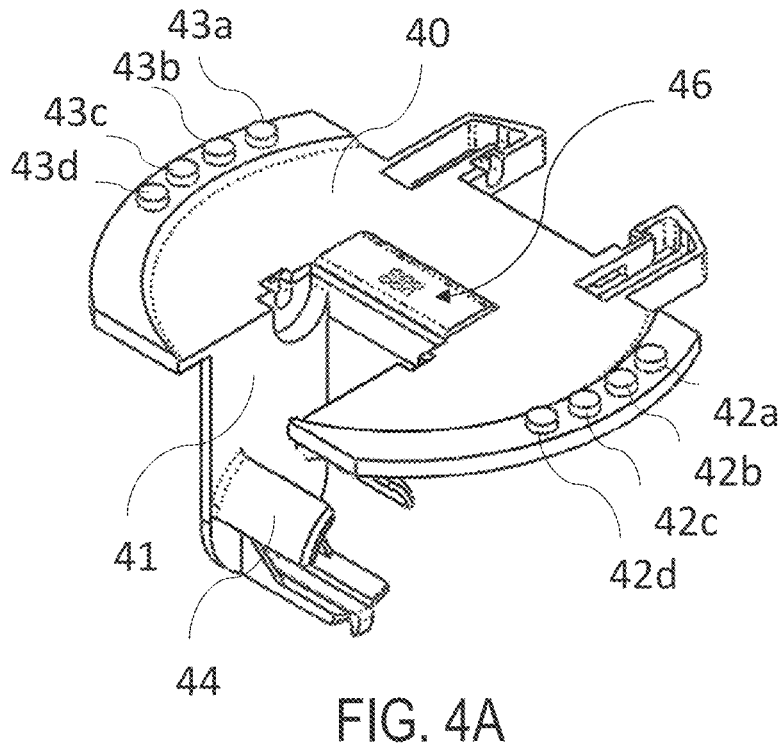
FIG. 4A shows a perspective view of a tape handling structure of an example device in accordance with an implementation of the present concepts.
Figure 4B:
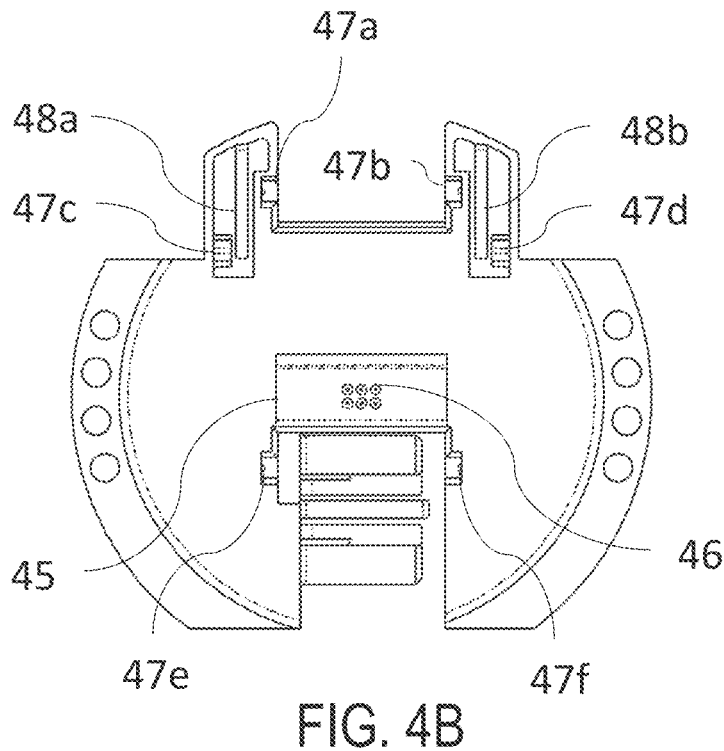
FIG. 4B shows a top view of a tape handling structure of an example device in accordance with an implementation of the present concepts.

FIG. 4A and FIG. 4B show perspective and top views of an example implementation of a tape handling structure 22 of FIG. 2. In an implementation, the tape handling structure 22 holds tape handling elements that may include a ratchet drum, tape handling rollers, and a tape medium. The tape handling structure 22 includes a planar top region 40 that is connected to a downward protruding structure 41. A tape reel axle holding structure 44 horizontally projects from the downward protruding structure 41. Alignment features 42a, 42b, 42c, 42d, 43a, 43b, 43c, and 43d may be positioned on the planar top region 40 and connect with complementary alignment features in a base structure 36 and a ring emboss-ing arm structure 21. As described with respect to the alignment features of FIGS. 3A and 3B, complementary alignment features 42a, 42b, 42c, 42d, 43a, 43b, 43c, and 43d may be implemented in other forms or shapes to prevent radial movement of the coupled elements of device 10.

The tape handling structure 22 further comprises an embossing anvil (or platform) 45, a plurality of coaxial grooves, and one or more pawls. In an implementation, the anvil 45 forms the surface for six concave cups or features 46 arranged in a two by three grid. Further, an example implementation may comprise of three pairs of coaxial grooves, 47a and 47b, 47c and 47d, and 47e and 47f to accept cylindrical axles of tape handling rollers 24a and 24b and a ratchet drum 23 and one or more pawls 48a and 48b to engage notches in the ratchet drum 23.

Figure 5A:
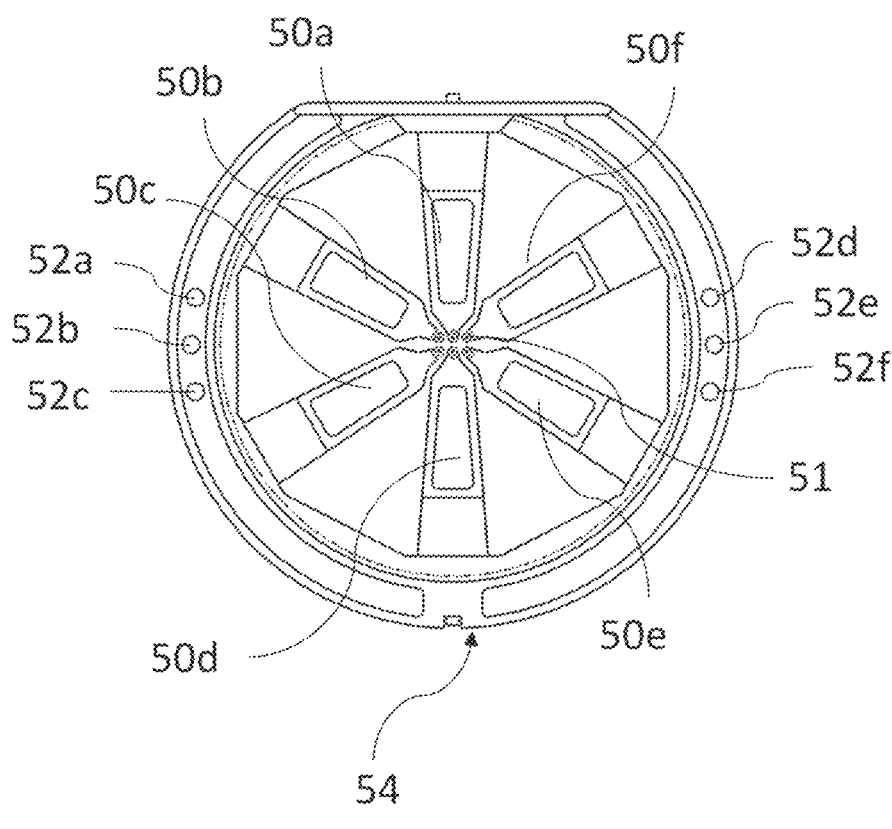
FIG. 5A shows a bottom-up view of a ring embossing arm structure of an example device in accordance with an implementation of the present concepts.
Figure 5B:
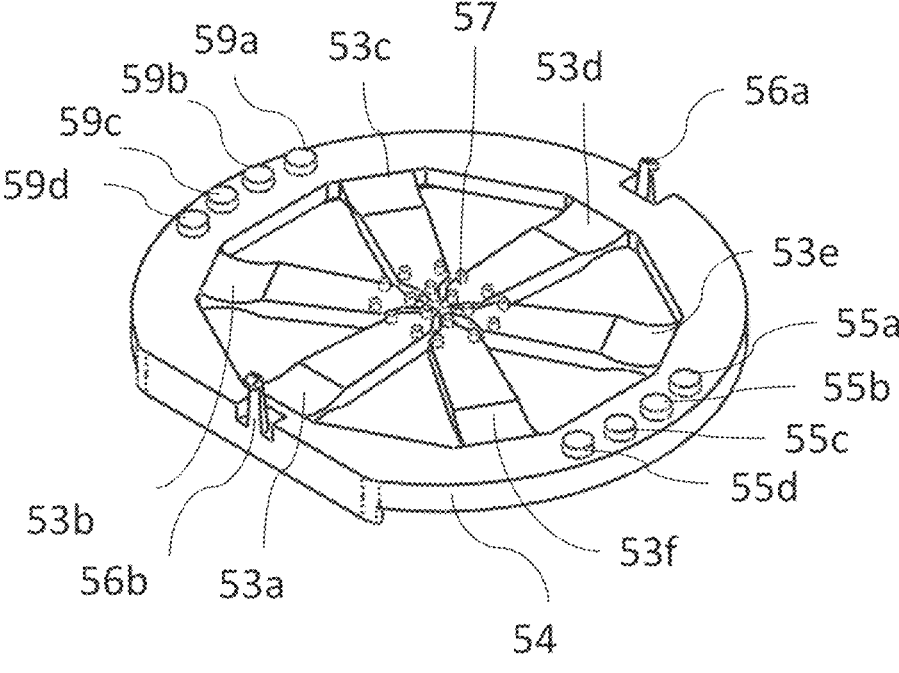
FIG. 5B shows a top-down perspective view of a ring embossing arm structure of an example device in accordance with an implementation of the present concepts.

FIG. 5A and FIG. 5B illustrate a bottom-up view and a top-down perspective view of an example ring embossing arm structure 54. The ring embossing arm structure 54 is made up of six embossing arms or beams 50a, 50b, 50c, 50d, 50e, and 50f projecting radially inwards. In an implemen-tation, each of the embossing arms is connected to the ring embossing arm structure 54 via a flexural hinge portion of the embossing arms 53a, 53b, 53c, 53d, 53e, and 53f. The embossing arms 53a, 53b, 53c, 53d, 53e, and 53f may all have the same shape and size, such as illustrated in FIG. 5A. In other implementations, the embossing arms or beams 50a, 50b, 50c, 50d, 50e, and 50f may each be configured to have different shapes and sizes. Further, in other implementations, the embossing arms may be connected to the ring embossing arm structure 54 via a different hinge mechanism, such as a living hinge or a cantilevered beam mechanism.

In an implementation, each of the embossing arms 50a, 50b, 50c, 50d, 50e, and 50f may taper to a convex tip, where the convex tips on the embossing arms form three rows by two columns of embossing tips 51. The embossing tips 51 align with the concave features 46 of FIG. 4B on the embossing anvil or platform 29 of FIG. 2.

In one implementation, the top alignment and attachment features 59a, 59b, 59c, 59d, 55a, 55b, 55c, and 55d of the ring embossing arm structure 54 connect with a top cap 20 of FIG. 2, while the bottom alignment and attachment features 52a, 52b, 52c, 52d, 52e, and 52f connect with a tape handling structure 22 of FIG. 2. In other implementations, different types of alignment and attachment features may be used to couple ring embossing arm structure 54 to the top cap 21 and/or tape handling structure 22. In addition to the top alignment and attachment features 59a, 59b, 59c, 59d, 55a, 55b, 55c, and 55d, snap hooks 56a and 56b may also be configured to connect the ring embossing arm structure 54 to a top cap 20. On the top of the embossing arms or beams 50a, 50b, 50c, 50d, 50e, and 50f towards the distal tip is an attachment feature 57 for a flexural snap (not shown) at the interface between said embossing arms 50a, 50b, 50c, 50d, 50e, and 50f and flexural button arms 60a, 60b, 60c, 60d, 60e, and 60f shown in FIG. 6A.

Figure 6B:
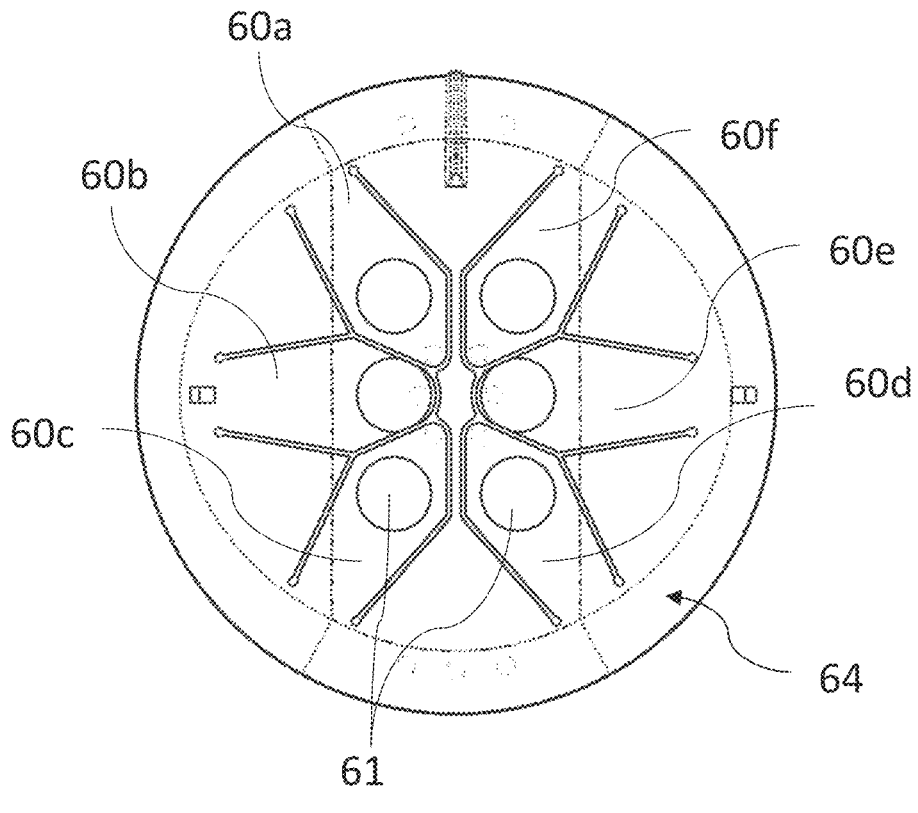
FIG. 6B shows a bottom-up view of a top cap of an example device in accordance with an implementation of the present concepts.
Figure 6A:
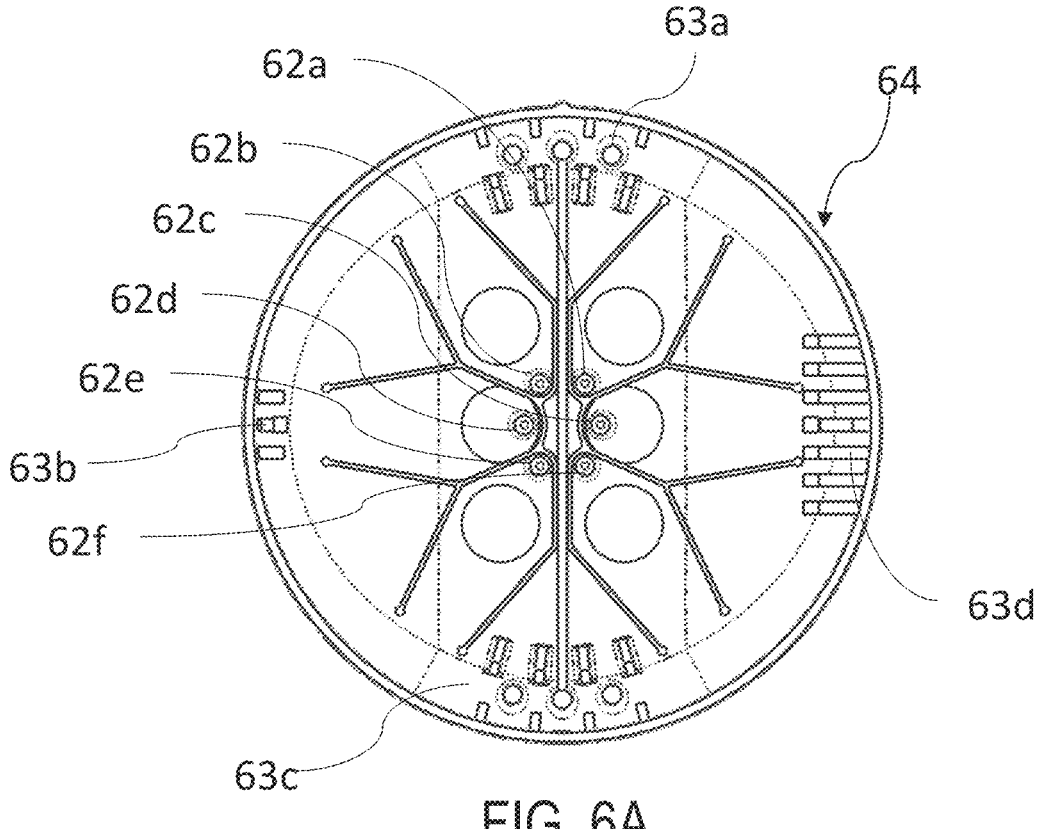
FIG. 6A shows a top-down view of a top cap of an example device in accordance with an implementation of the present concepts.

FIG. 6A and FIG. 6B illustrate a top-down and a bottom-up view of a top cap 64. The top cap 64 may be configured with six flexural button arms 60a, 60b, 60c, 60d, 60e, and 60f pointing inwardly towards the center of the top cap 64. Each flexural button arm may include a concave features or buttons 61 to indicate to a user of the device 10 where to apply force. As shown in FIG. 6B, downward protruding column 62a, 62b, 62c, 62d, 62e, and 62f may be attached at the distal end of corresponding flexural button arms 60a, 60b, 60c, 60d, 60e, and 60f to transfer forces to correspond-ing embossing arms or beams 50a, 50b, 50c, 50d, 50e, and 50f of FIG. 5. Further, underneath the top cap 64 is a downward facing receiving region for connecting to the ring embossing arm structure 54 of FIG. 5A. The receiving region includes alignment and attachment features 63a, 63b, 63c, and 63d. In other implementations, the receiving region may be configured to include different types, sizes, or shapes of alignment features.

FIG. 7A and FIG. 7B illustrate side and top-down views of a ratchet drum 74 with axial grooves 70. The axial grooves 70 are equally spaced about the circumference of the drum 74. As shown in FIG. 7B, two roller surfaces are located in the center of the drum 74 with protruding cylindrical axles 71 and 72, which rotate in one of the coaxial groove pairs (47a-b, 47c-d, or 47e-f) of the tape handling structure 22. Empty cavities 73 in the drum 74 are for manufacturing purposes. In an alternative implementation, ratchet drum 74 may be manufactured to not include empty cavities 73. In operation, the ratchet drum 74 rolls on the protruding axles 71 and 72 and is rotated by the tape medium wrapped around the drum. Further, the ratchet drum 74 and pawls provide feedback when the tape medium is advanced by the spacing increment between the axial grooves 70. The pitch between the axial grooves 70 is 6.2 mm corresponding to the accepted spacing between braille characters.

FIG. 8 shows a perspective view of a cylindrical tape guiding roller 83. The cylindrical tape guiding roller 83 comprises of cylindrical guides 81 for the tape medium, a central groove 82, and protruding cylindrical axles 80a and 80b. The tape guiding roller 83 reduces friction as the tape medium moves from the tape roll over the embossing anvil or platform 45 of FIG. 4B and down to the ratchet drum 74 of FIG. 7. The protruding cylindrical axles 80a and 80b rotate in one of the coaxial groove pairs (47a-b, 47c-d, or 47e-f) of the tape handling structure 22. The central groove 82 provides sufficient spacing for embossed braille characters as the tape medium passes over the roller 83 to prevent flattened out of the characters.

Figure 9:
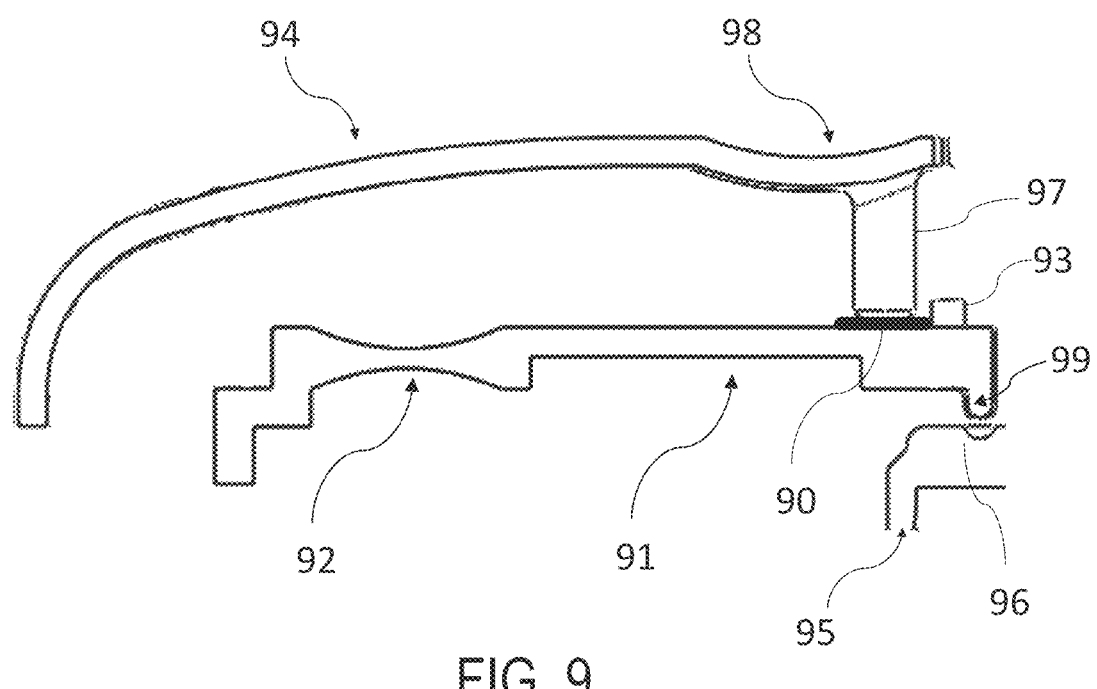
FIG. 9 shows a side view of an interface between a top cap, snap dome, embossing arm, and embossing anvil of an example device in accordance with an implementation of the present concepts.

FIG. 9 shows a side view of two interfaces for transferring force from a user of device 10 to emboss braille characters on a tape medium. The first interface transfers force between a single flexural button arm 94 to a single embossing arm or beam 91 via a downward protruding column 97. In an implementation, the flexural button arm 94 may include a curved or tactile portion 98 to indicate where the user of the device should apply force on the flexural button arm 94. The second interface transfers force received by embossing arm 91 to a concave feature 96 in an embossing anvil or platform 95. Further, embossing arm 91 may be configured to comprise of a snap dome 90 in a position substantially below the downward protruding column 97. Snap dome 90 may be held on the embossing arm 91 by attachment features 93 or other means. When sufficient force is applied at the flexural button arm 94, flexural hinge 92 allows embossing arm 91 to bend downwards until the embossing tip 99 contacts the concave feature 96 in the embossing anvil or platform 95.

Figure 10:
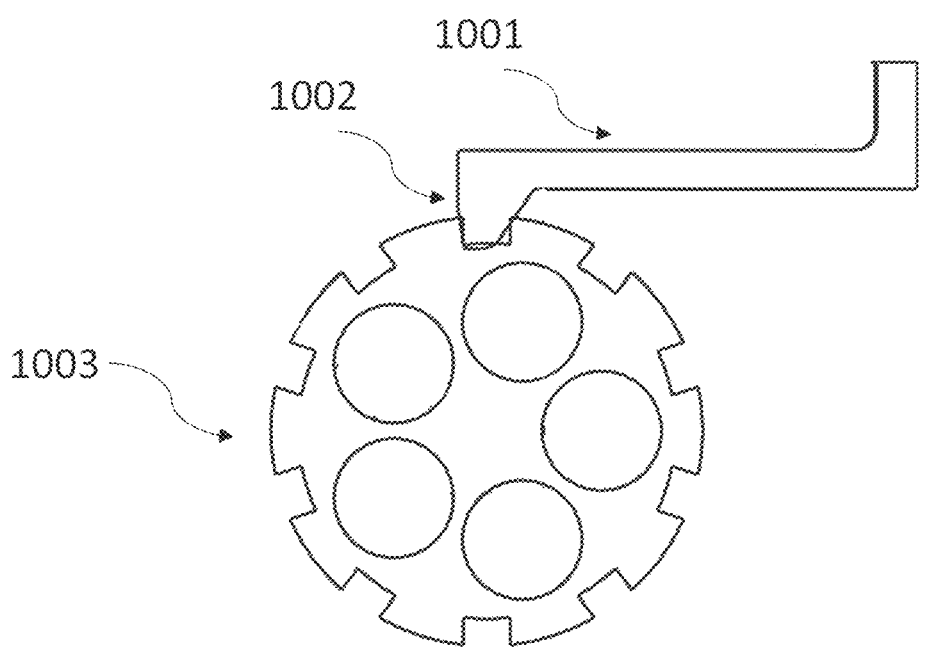
FIG. 10 shows a side view of an interface between a ratchet drum and a pawl of an example device in accordance with an implementation of the present concepts.

FIG. 10 shows a side view of the interface between the ratchet drum 1003 (also shown as element 74 of FIG. 7A) and a pawl 1001 (other pawl is not shown) via a pawl protrusion 1002. As the ratchet drum 1003 is turned by the tape, the pawl 1001 is bent upwards by the applied force and moves into the next groove of the ratchet drum 1003. In other implementations, a single pawl element may be in contact with the ratchet drum 1003. Further, pawls 1001 and other pawls may be coupled to other portions of device 10, such as the base structure 26.

Figure 11:
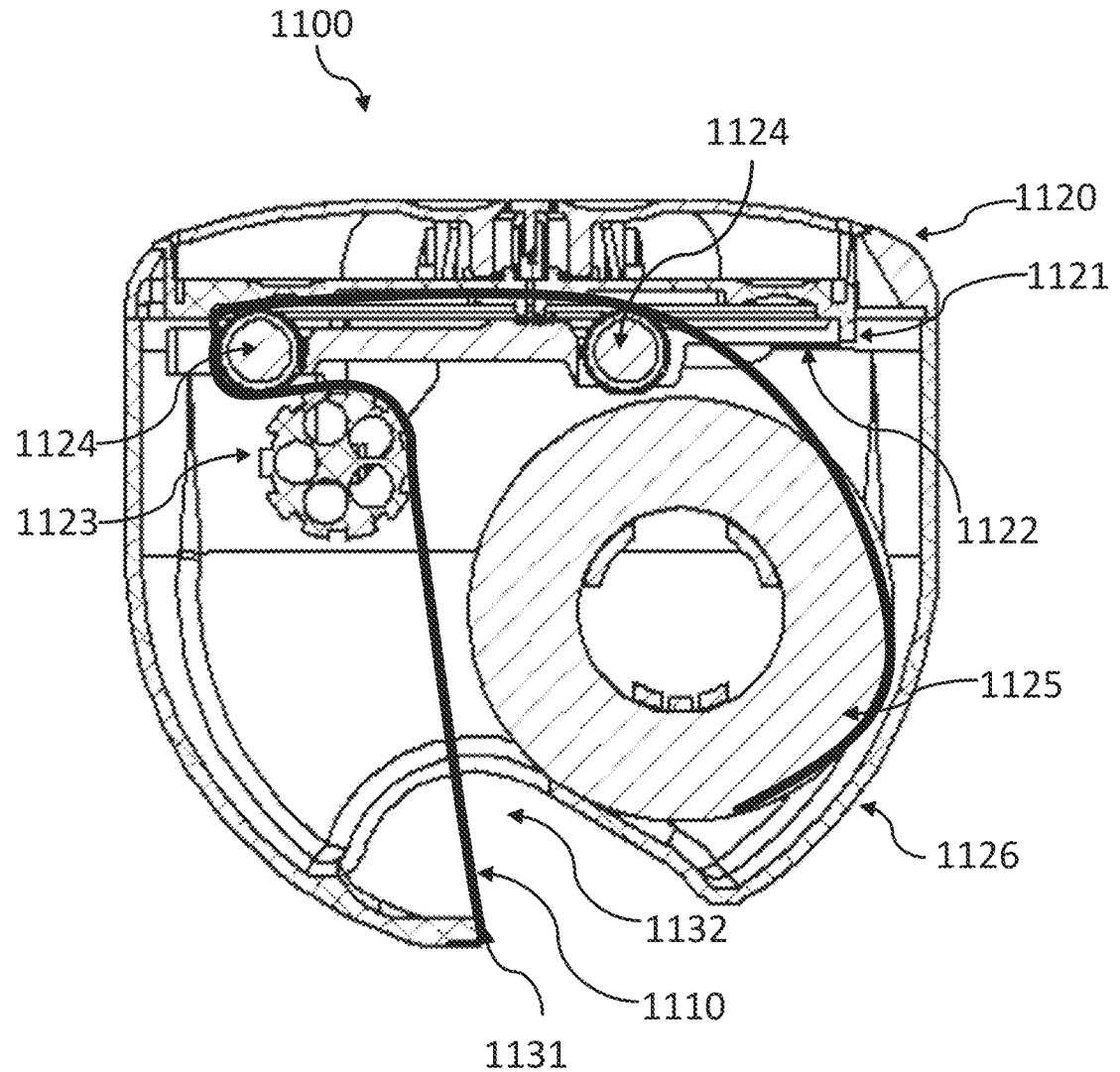
FIG. 11 shows a cross sectional view of an assembled example device with tape routing in accordance with an implementation of the present concepts.

FIG. 11 shows a cross sectional view of the assembled device 1100. The tape medium route is illustrated as tape medium 1110 extends from the tape medium roll 1125 to a first tape handling roller 1124 over the tape handling structure 1122 and underneath the ring embossing arm structure

1121. The tape medium 1110 further routes over a second tape handling roller 1124, over portions of the ratchet drum 1123, down through the tape exit port 1132 of the base structure 1126, and sticks to the cutting edge 1131. The adhesive side of the tape medium 1110 may be configured to face upward on top of the tape handling roller 1124, in other words, facing away from the roller.

In an example implementation, device 10 may be manufactured and assembled using plastic injection molded parts. In other implementations, device 10 may also be additively manufactured or stamped out of metal. In a configuration, device 10 uses flexures to emboss the braille dots, and coupled flexures to create ergonomic haptic feedback.

Figures 12A, 12B, 12C:
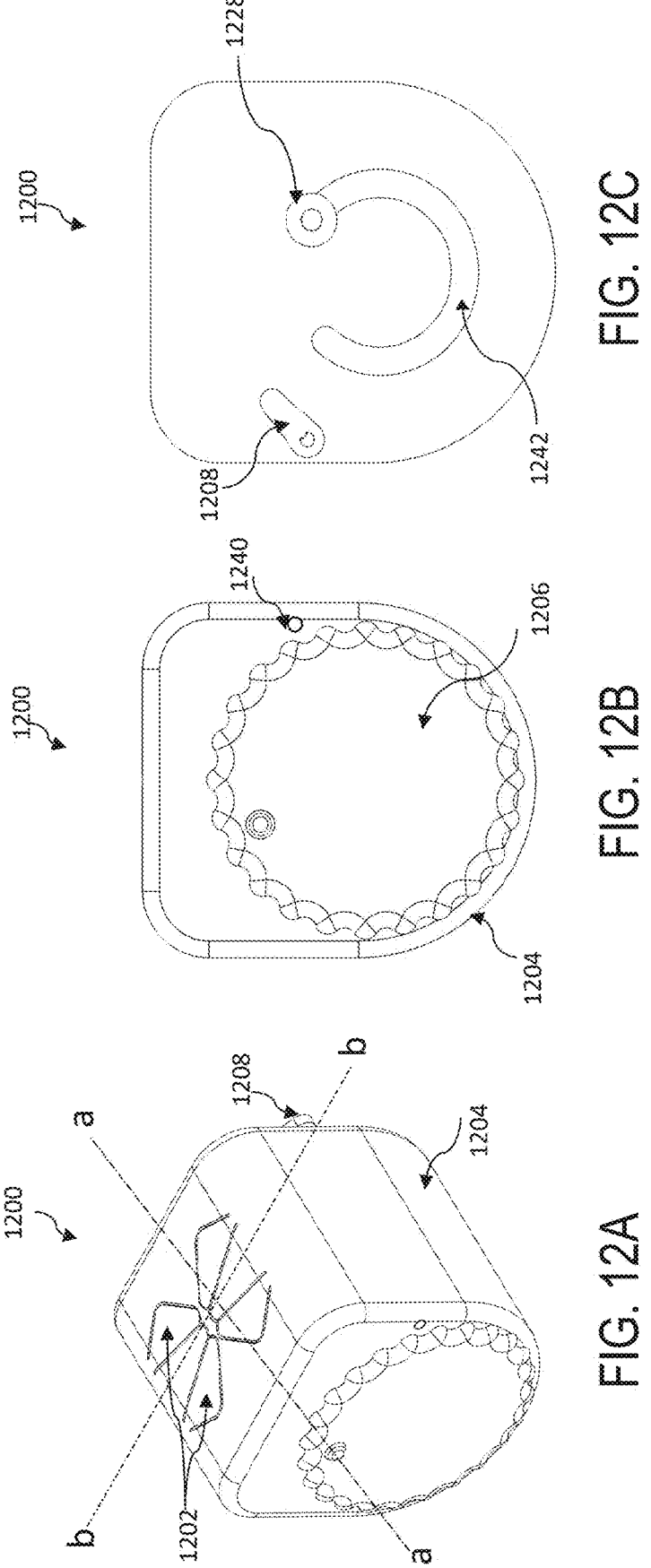
FIG. 12A shows a perspective view of an assembled example device in accordance with an implementation of the present concepts.
FIGS. 12B and 12C show side views of an assembled example device in accordance with an implementation of the present concepts.

Another example implementation of the disclosed device, which will now be described in detail in conjunctions with the drawings. FIG. 12A depicts a perspective view and FIGS. 12B and 12C depict side views of another example implementation of disclosed device 1200. Device 1200 may be made of an injection moldable thermoplastic material, plastically deformable metal, or other resilient metal material.

Device 1200 may be configured in a single piece or configured with multiple components. One or more components of the implementations described herein may be provided in a kit. In an implementation, as shown in FIGS. 12A, 12B, and 12C, device 1200 may be comprised of flexural buttons (or button arms) 1202 for transferring embossing force, a housing 1204, an indexing swing arm dial 1206, a cutting switch 1208, a gross indexing wheel knob 1228, a cutting arm shaft support 1240, a guide opening 1242 for guiding the movement of the tape handling structure, and additional components that will be described in relation to other figures. For example, device 1200 of FIGS. 12A, 12B, and 12C may be provided with component portions shown in FIG. 13A.

Similar to the device shown in FIGS. 1-11, the device shown in FIG. 12A shows a device for Braille character entry allowing a user to enter one character at a time and accurately advance the medium one character at a time. In other words, this implementation also discloses a device including a mechanism for inputting Braille letters such that these letters are embossed or impressed on a medium and an advancement mechanism is used to move the medium forward for additional character input or removal of the medium.

Figure 13A:
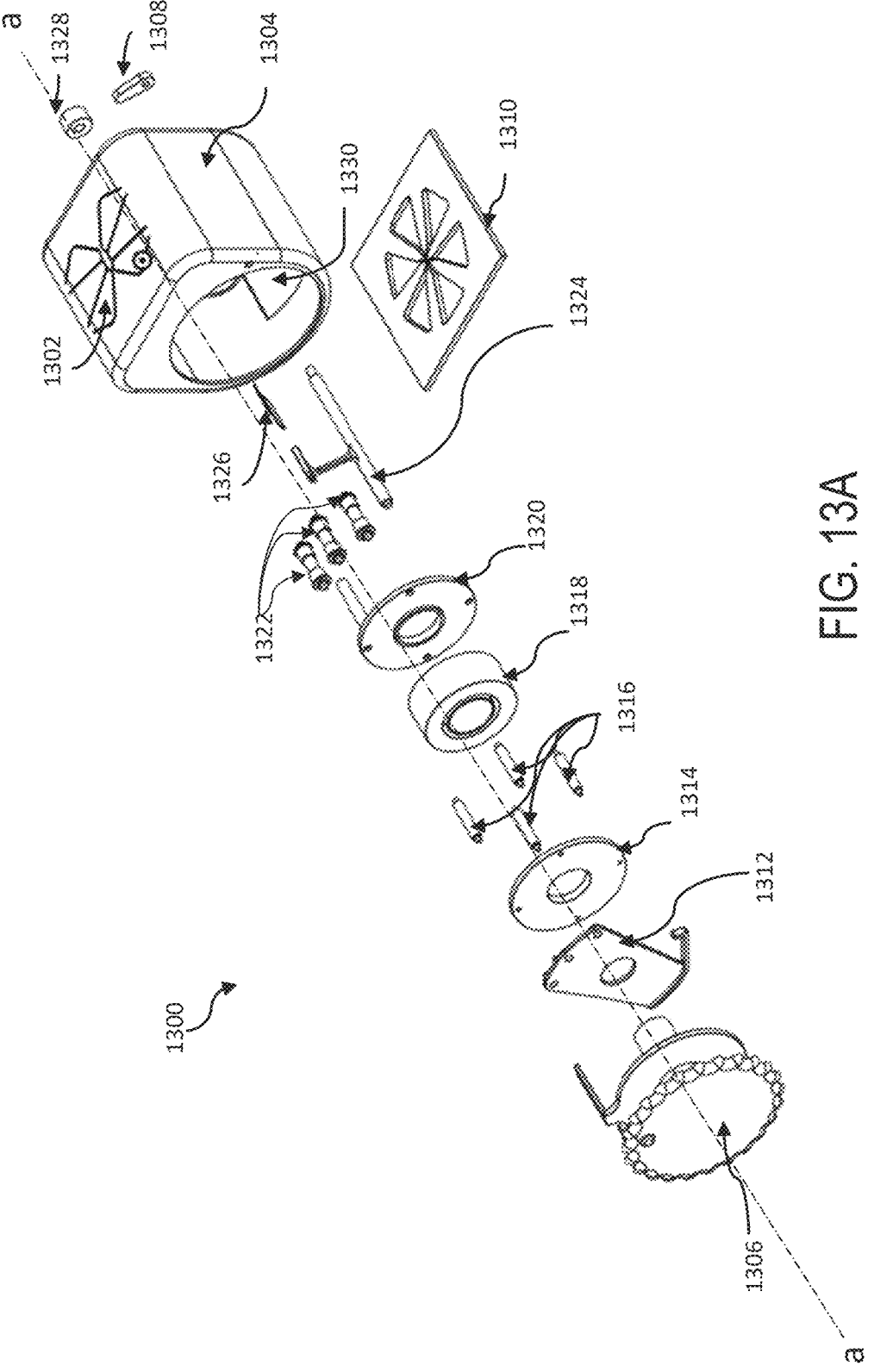
FIG. 13A shows an exploded perspective view of an example device in accordance with an implementation of the present concepts.
Figure 13B:
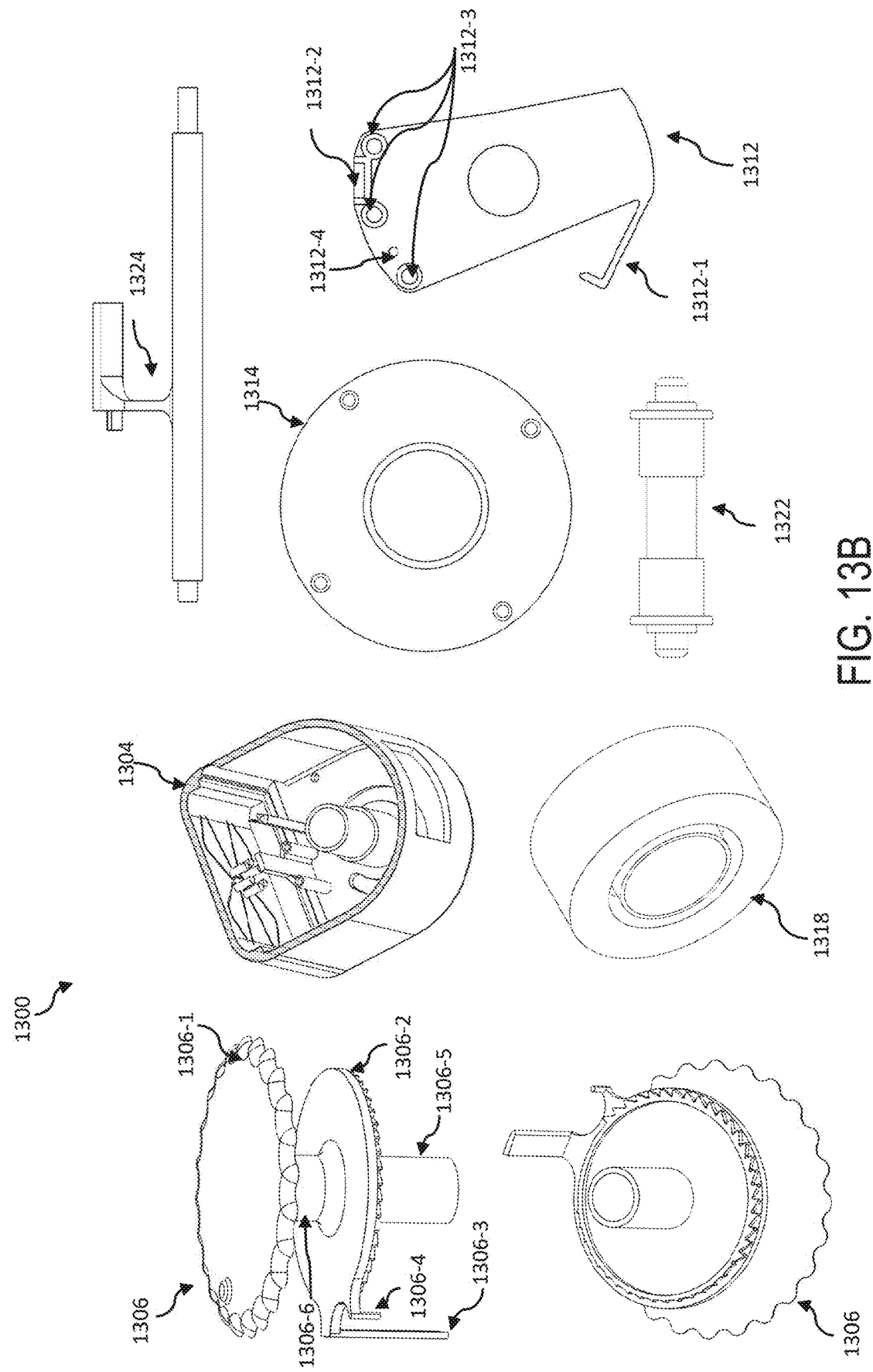
FIG. 13B shows a view of various components of an example device in accordance with an implementation of the present concepts.
Figure 13C:
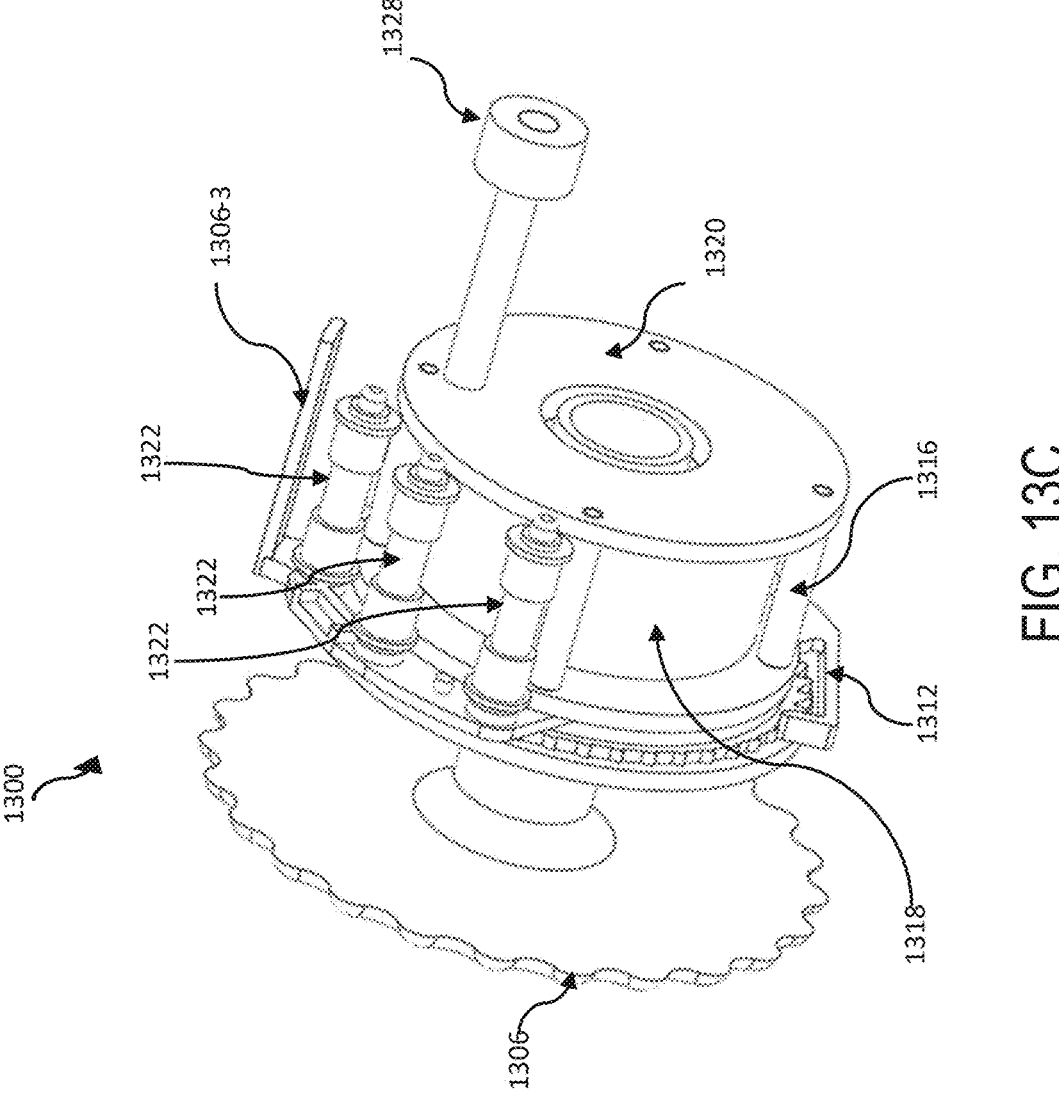
FIG. 13C shows a perspective view of an internal assembly of an example device in accordance with an implementation of the present concepts.

FIG. 13A depicts an exploded perspective view of an example implementation of device 1300. FIG. 13B depicts example implementations of individual interior components of device 1300 and FIG. 13C depicts a perspective view of a limited set of assembled interior components of device 1300. In an example, device 1300 may be comprised of flexural buttons 1302 that is disposed on housing 1304, an indexing swing arm 1306 that is removable from the housing 1304, and an exit opening 1330 in the bottom of the housing for removing unspooled tape medium 1318. Within the housing 1304 and disposed between indexing swing arm 1306 are additional components that perform other functions within device 1300.

The indexing swing arm 1306 has a first portion 1306-1 and a second portion 1306-2 that are connected by cylindrical post 1306-6 positioned between at least a part of the first portion 1306-1 and the second portion 1306-2. In some implementations, the cylindrical post 1306-6 may be solid, hollow, or closed at the end abutting the first portion 1306-1 and open at the end abutting the second portion 1306-2. The second portion 1306-2 may also be configured to include second cylindrical post 1306-5 for receiving other interior components of the housing 1304. The second portion 1306-2 may also include a set of ratchet notches on its surface, a swing arm 1306-3 for unspooling and advancing the tape medium over the embossing anvil, and a release element 1306-4 for releasing the cutting arm. Indexing swing arm 1306 may be configured to include cylindrical post 1306-5 that receives a pawl support element 1312 and a tape handling structure. Pawl support element 1312 further comprises support for a pawl portion 1312-1, embossing anvil support 1312-2, roller supports 1312-3, and cutting anvil support 1312-4. The roller supports 1312-3 are configured to receive the tape rollers 1322.

In an implementation, a tape handling structure may be made up of multiple components that are assembled as part of kit to hold a tape medium 1318. For example, the tape handling structure may be comprised of a circular base plate 1314, a plurality of support posts 1316, and a top circular plate 1320. Support posts 1316 are disposed and coupled to the top circular plate 1320 and base circular plate 1314 to support a tape medium 1318 located between the plates 1314 and 1320. As those of skill in the art would understand, the support posts may be configured to be fixedly or rotatably coupled to the top circular plate 1320 or base circular plate 1314. Top circular plate 1320 further includes a protruding post that extends to and through the opposing side of housing 1304 to couple to an external gross indexing wheel knob 1328. The top circular plate 1320 and gross indexing wheel knob 1328 are configured to rotate together with the gross indexing wheel knob 1328 determining the rate and direction of rotation. The gross indexing wheel knob 1328 anchors the tape handling structure to the housing 1304 and provides a means for rotating the tape handling structure such that the tape handling structure and the gross indexing wheel knob 1328 combine to function as a gross indexing wheel.

The device 1300 may further include a cutting arm 1324, which includes a shaft that couples a support hole in the housing 1304. Although not shown in FIG. 13, the shaft of the cutting arm may be a surrounded by a torsion spring for returning the cutting arm 1324 to an open and non-cutting position. The cutting arm 1324 may be configured to hold a cutting blade and to include a snap lock feature. As will be discussed in the operation of the device 1300, the cutting arm 1324 is moved to the closed and cutting position by actuating the cutting switch 1308 on the outer surface of the housing 1304. The device 1300 further comprises fixed anvil blades 1326 that are configured and positioned to receive the cutting arm 1324 and cut unspooled tape medium 1318 that passes over the fixed blades 1326. The device 1300 may be further configured to include an embossing arm structure 1310 that is located between the flexural buttons 1302 and the tape medium 1318.

Figures 14A, 14B, 14C:
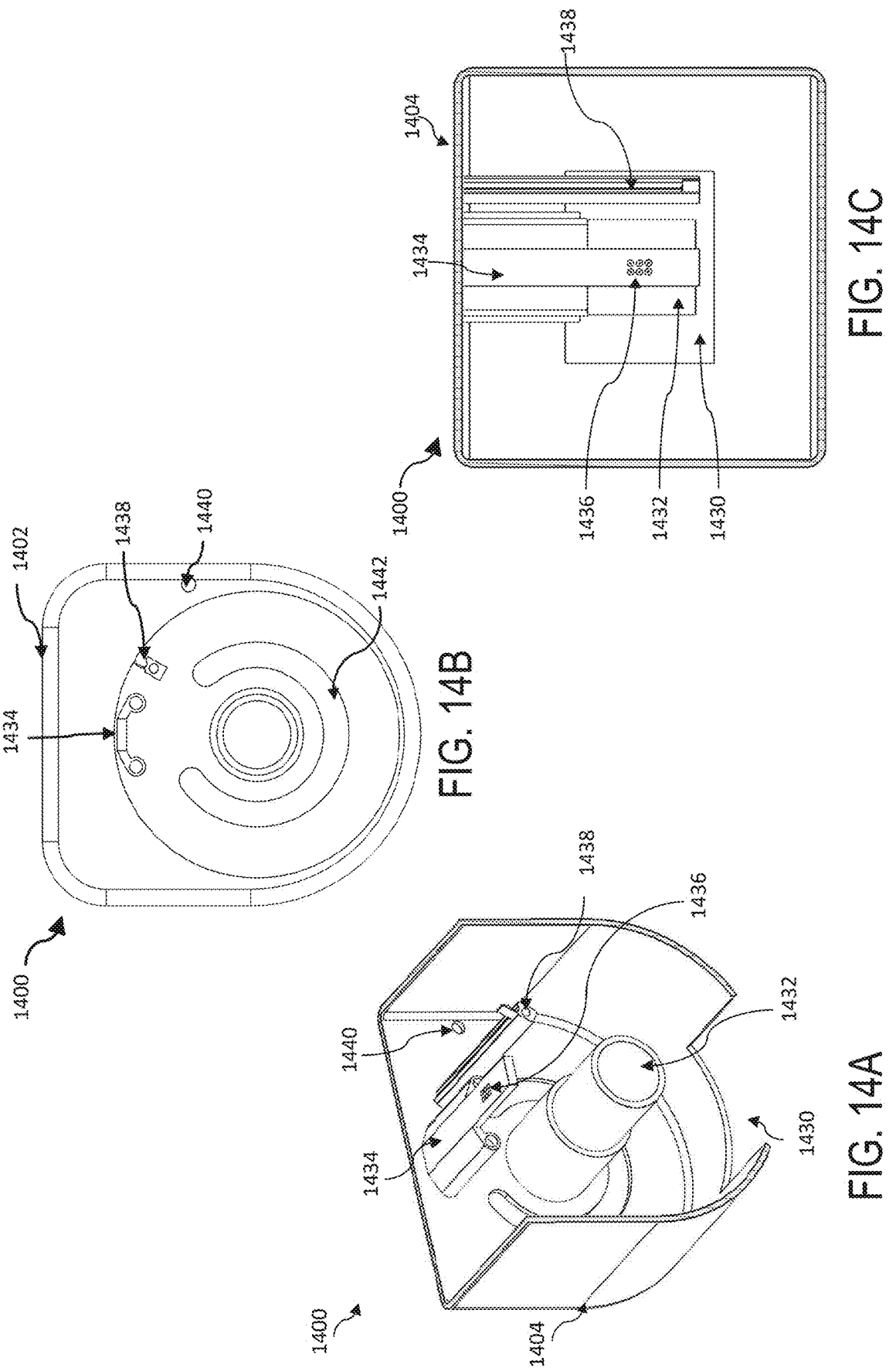
FIGS. 14A, 14B, and 14C shows perspective, side, and top-down interior housing views of an example device in accordance with an implementation of the present concepts.

FIGS. 14A, 14B, and 14C depict perspective, side, and top-down interior housing views of an example implementation of device 1400 with certain elements affixed to housing 1404 of the device 1400. For example, device 1400 may be configured to have an exit opening 1430 at the bottom of the housing 1404 on the opposite side of the flexural buttons 1402. As shown, the interior of the housing 1404 may also include a protruding support member 1432 that supports the tape handling structure, an embossing platform (or anvil) 1434 with concave feature 1436, a cutting anvil 1438 for receiving a tape medium cutting blade, and a cutting arm shaft support 1440. The cutting anvil 1438 may be further configured with a snap feature capable of capturing the snap lock feature on cutting arm 1324. The housing 1404 may further be configured to include a guide opening 1442 with a radius for guiding the rotation and movement of the gross indexing wheel (i.e., a tape handling structure and a gross indexing wheel knob 1328).

Figures 15A, 15B:
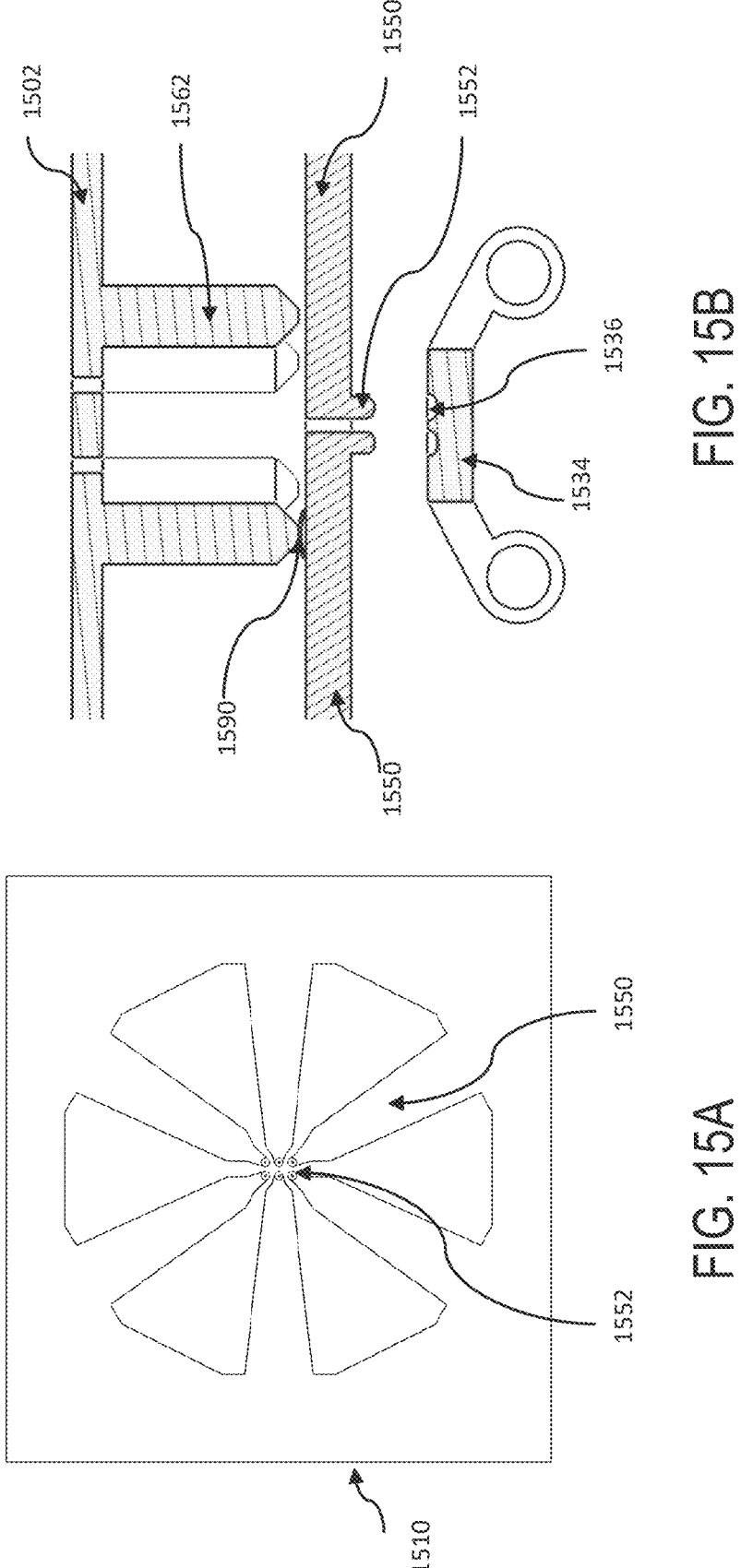
FIG. 15A shows a bottom-up view of an embossing arm structure of an example device in accordance with an implementation of the present concepts.
FIG. 15B shows a cross-sectional view of flexural buttons, embossing arm structure, and embossing platform of an example device in accordance with an implementation of the present concepts.

FIG. 15A illustrates a bottom-up view of an embossing arm structure 1510. In this example, embossing arm structure 1510 has a square shape; however, in other example implementations, embossing arm structure may be configured in the shape of a circle, octagon, or shape to conform to the shape of the braille writer housing. As shown in FIG. 15A, embossing arm structure 1510 comprises of embossing arms 1550 (*a-f*) where each of the arms may taper towards a convex embossing arm tip 1552 (*a-f*). The convex tips of the embossing arms 1550 form three rows by two columns of embossing arm tips 1552. On the opposing side of the embossing arms 1550, each embossing arm may be configured to have a plurality of snap dome holding columns on top of each arm for holding a snap dome 1590 on each of the arms. The embossing arm structure 1510 may also be configured to have connecting features like elastic averaging bumps and snap hooks for connecting the embossing arm structure 1510 to the device housing.

FIG. 15B depicts a cross-sectional view showing an example configuration of flexural buttons 1502, embossing arm structure 1510, and embossing platform 1534. As shown, each of the flexural buttons 1502 may be configured to have a downward protruding column 1562. In an example configuration, there may be as many downward protruding columns 1562 as necessary to corresponding to each embossing arm 1550 in the device. Each protruding column 1562 may be arranged to substantially overlap snap dome 1590 on each embossing arm 1550. Further, each of the convex embossing arm tips 1552 may be arranged to substantially overlap each of the concave cups or features 1536 on the embossing platform 1534. The transfer of force from the flexural buttons 1502 to a tape medium positioned between the embossing arm tips 1552 and the embossing platform 1534 may operate in a manner to that described with reference to FIG. 9. Nonetheless, a person of ordinary skill in the art would understand that there may be alternative means of transferring force from the flexural buttons 1502 to embossing platform 1534 with the spirit of this disclosure.

Figure 16:
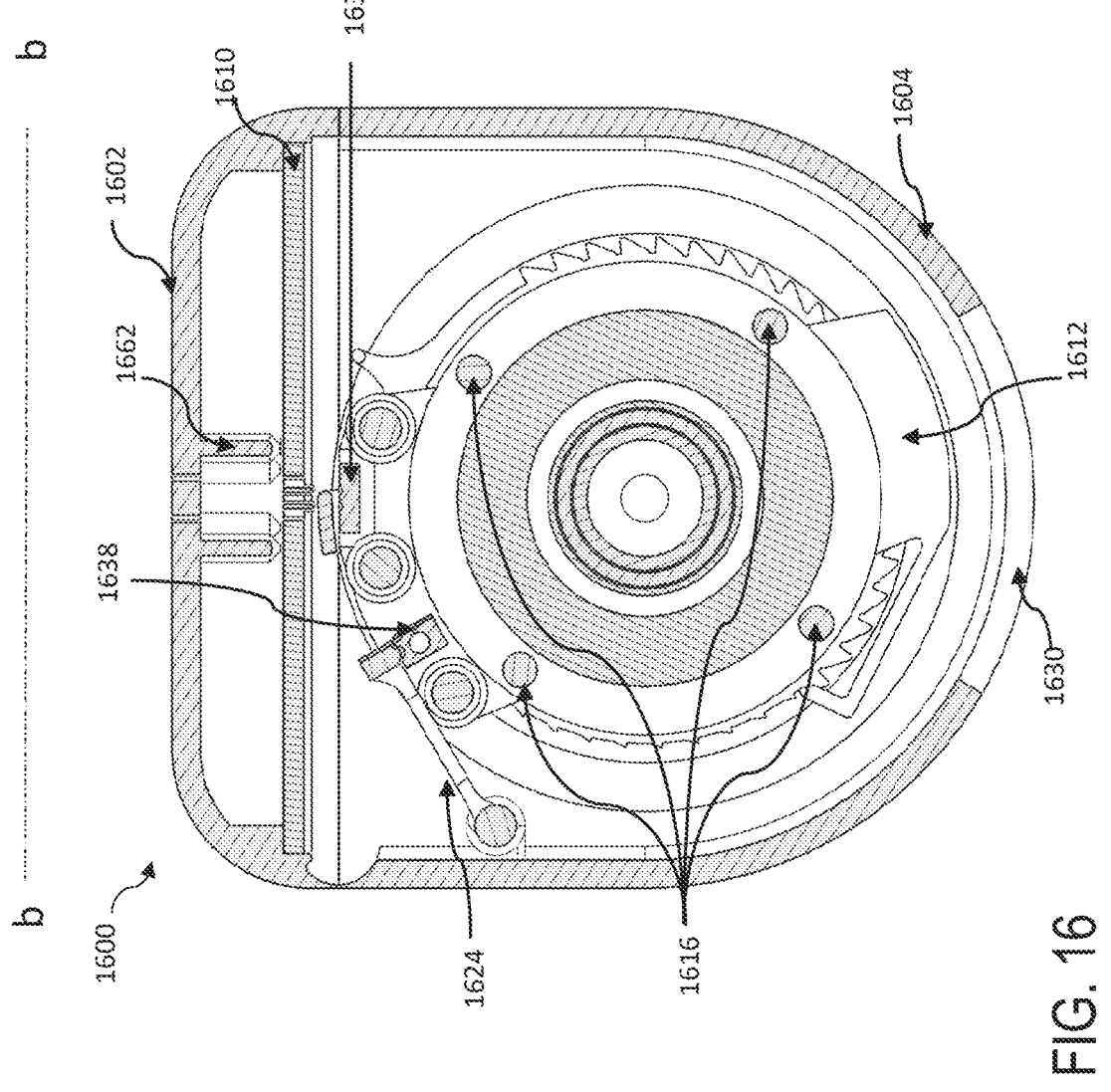
FIG. 16 shows a cross-sectional view of an interior of an example device in accordance with an implementation of the present concepts.

FIG. 16 depicts a cross-sectional view of an interior of device 1600 showing the attachment of embossing arm structure 1610 to the device housing 1604. This cross-sectional view is on the b-b axis as depicted in FIG. 12A. In this example implementation, device 1600 is comprised of flexural buttons 1602 with downward protruding columns 1662 (*a-f*) located above embossing arm structure 1610 towards the top of the housing 1604 with a tape exit port 1630 towards the bottom of the housing 1604. The embossing arm structure 1610 may configured to be on a ledge or lip in the top part of the device housing 1604. An elastic averaging mechanism may be used to connect embossing arm structure 1610 to the housing 1604 precisely. Alternatively, the embossing arm structure 1610 could also be press fit into place within the housing 1604, or the connection can be made utilizing any other fastening method. For example, housing 1604 may be configure to have a hinge on one side and a full split all the way around the housing 1604 such that the top of the housing 1604 may be open like a clam shell to expose the interior pieces, such as, cutting arm 1624, cutting anvil 1638, and the tape handling structure. In other implementations, embossing arm structure 1610 may be connected to the housing 1604 using fasteners, adhesive, snap fits, or other connecting means.

Figures 17A, 17B:
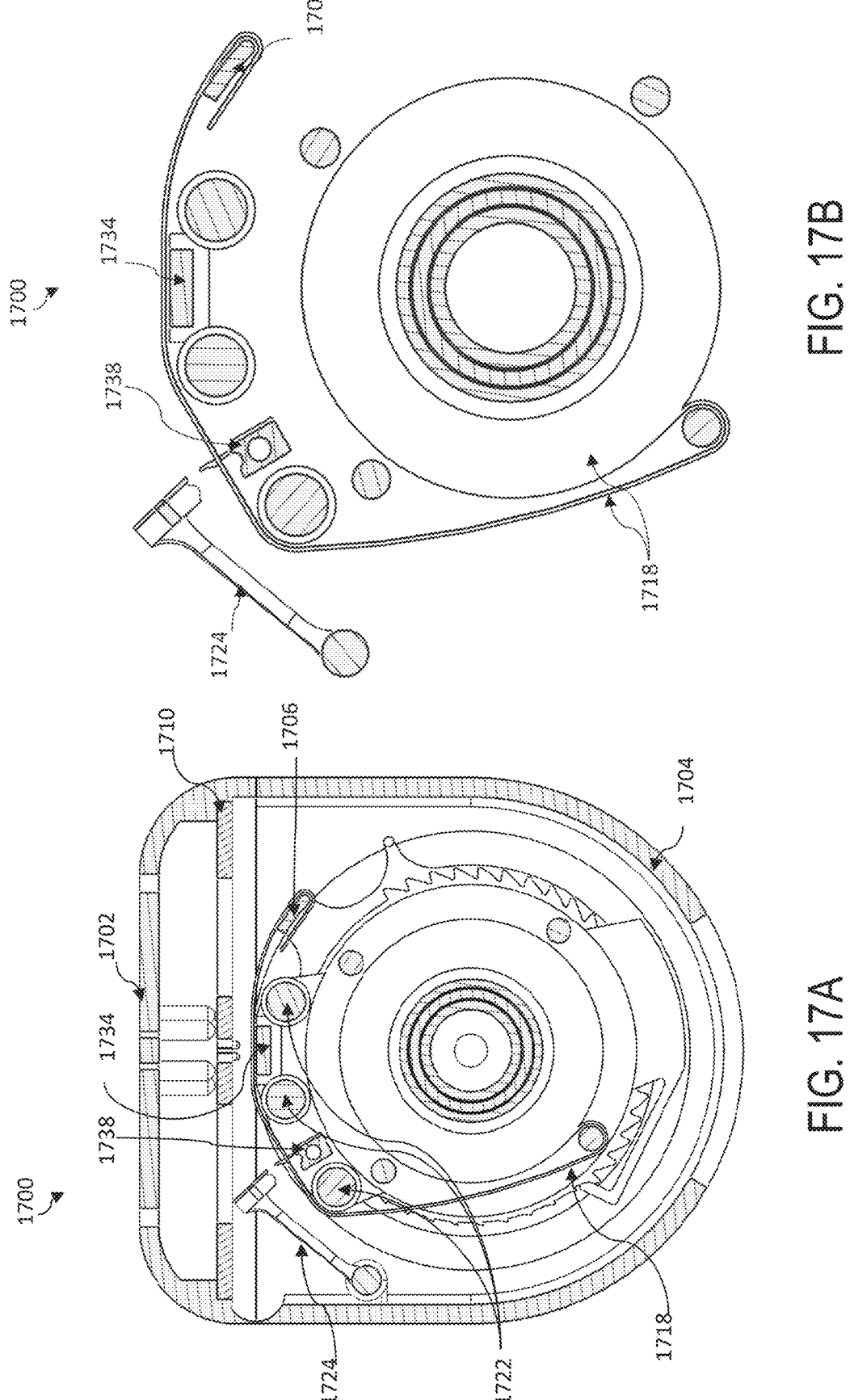
FIG. 17A shows a cross-sectional view of an example device with a tape medium loaded within the device housing in accordance with an implementation of the present concepts.
FIG. 17B shows a cross-sectional view of an example device with a tape medium unspooled within the device housing in accordance with an implementation of the present concepts.

FIGS. 17A and 17B depict cross-sectional views of an example implementation of braille writing device 1700 with a tape medium 1718 loaded and unspooled within the housing 1704. These cross-sectional views are on the b-b axis as depicted in FIG. 12A. FIG. 17B is a focused view of FIG. 17A with certain elements removed for purpose of illustrating the tape medium path through the interior of device 1700. As shown in FIGS. 17A and 17B, tape medium 1718 is unspooled and passes over tape rollers 1722, cutting anvil 1738, embossing platform 1734, and anchored to indexing swing arm 1706. The tape medium 1718 passes beneath cutting arm 1724 and embossing arm structure 1710. With reference to FIG. 16, the flexural buttons 1702 transfers force applied by a user of the device to the embossing arm structure 1710 to write a character on the portion of the tape medium 1718 that overlaps the embossing platform 1734.

With further reference to FIGS. 13 and 17A, in order to remove or replace the tape medium 1718, indexing swing arm 1306, pawl support element 1312, and the base circular plate 1314 need to be removed from the housing 1704 first. After the tape medium 1718 is replaced, the top plate 1320 of the tape handling structure is rotated completely clockwise and the loose end of the tape medium 1718 is pulled over the tape rollers 1722 with the sticky side of the tape medium 1718 facing outwards. The tape medium 1718 is pulled counterclockwise over the cutting anvil 1738 and the cutting mechanism is engaged by rotating or actuating the cutter switch 1308. The cutting mechanism is described in further detail below with reference to FIGS. 19A and 19B. With the cutting mechanism engaged and the tape medium 1718 is held in place, the removed pieces (indexing swing arm 1706, pawl support element 1312, and the base circular plate 1314) are reassembled and reinstalled into the device housing 1704. With the indexing swing arm 1706 reinstalled, the indexing swing arm 1706 needs to be rotated counterclockwise until the release element 1306-4 of the indexing swing arm 1706 releases the cutting arm 1724, picks up the tape medium 1718, and moves the tape medium 1718 past the embossing platform 1734.

Figure 18:
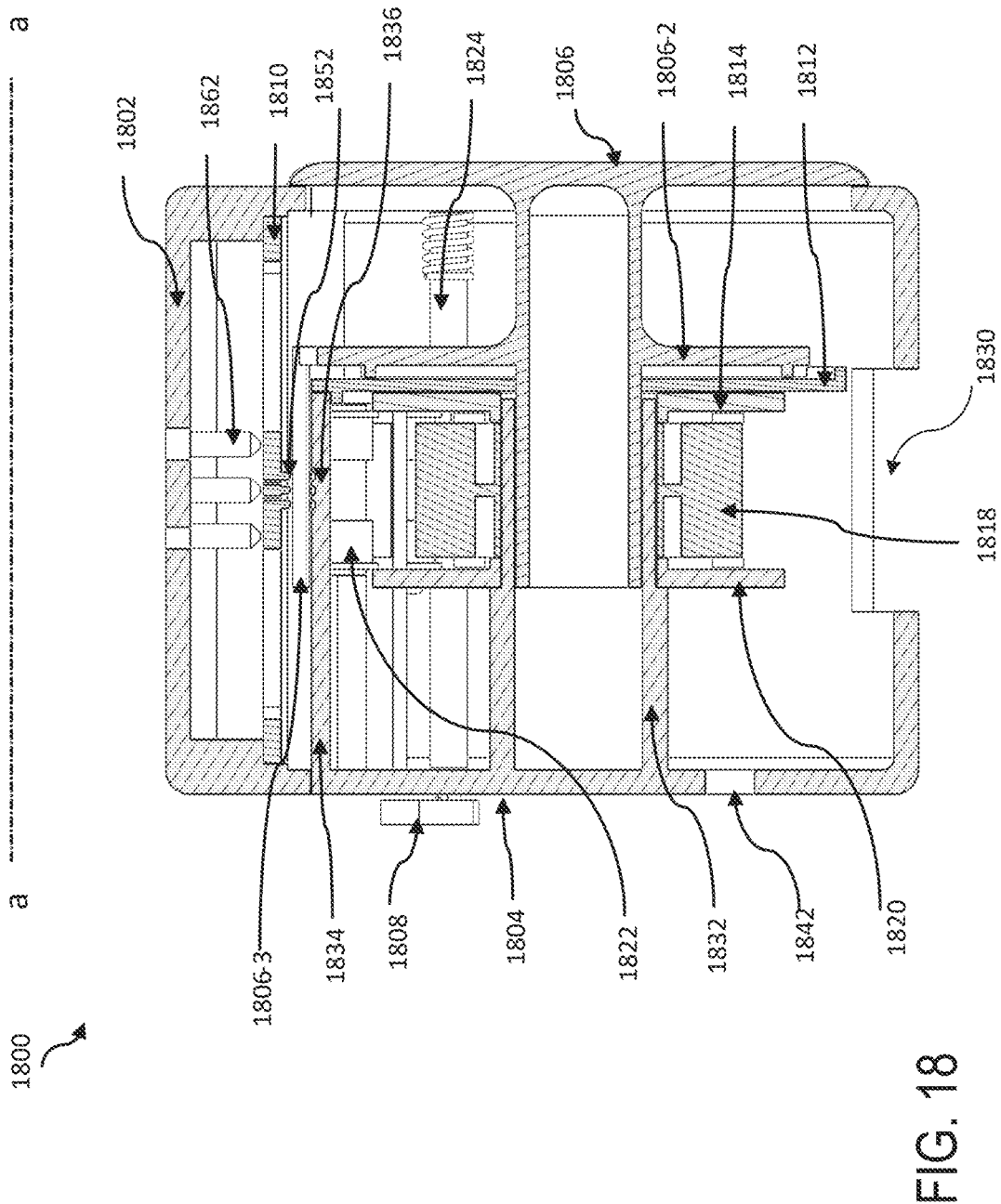
FIG. 18 shows a cross-sectional view of an example device in accordance with an implementation of the present concepts.

FIG. 18 depicts a cross-sectional view of an example assembled braille writing device 1800 along the a-a axis (as shown in FIG. 12A). In this example, device 1800 includes flexural buttons 1802 with protruding columns 1862 in the top portion of the device and above the embossing arm structure 1810. The embossing arm structure 1810 is comprised of a plurality of embossing arms and embossing tips. The top portion of device 1800 may be coupled to a bottom portion of the device via a hinge on one side and split around the remaining sides of the device for ease of access to the interior components. The bottom portion of device 1800 with housing 1804 holds the embossing platform 1834, which is located below the embossing tips 1852. The interior of the housing 1804 further includes rollers 1822, cutting arm 1824 (shaft is shown), swing arm of the indexing swing arm 1806, tape medium 1818, protruding support structure 1832, tape handling structure base plate 1814 and top plate 1820, and pawl support element 1812. On the exterior of the housing 1804 are located the radial knob portion of the indexing swing arm 1806, grossing indexing wheel guide opening 1842, cutting switch 1808, and tape exit port 1830.

Figure 19A:
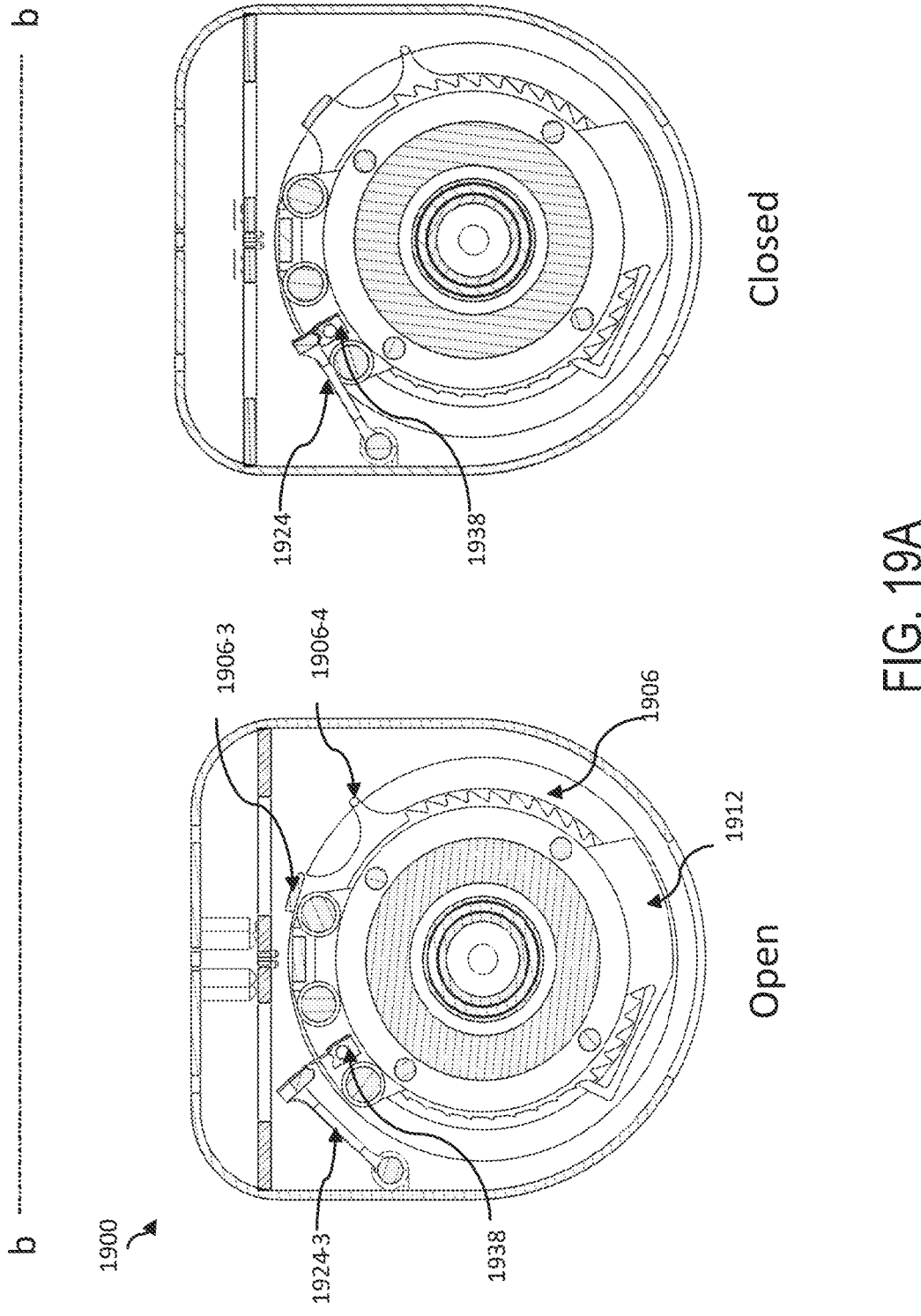
FIGS. 19A and 19B show cross-sectional views of an example device in accordance with an implementation of the present concepts.
Figure 19B:
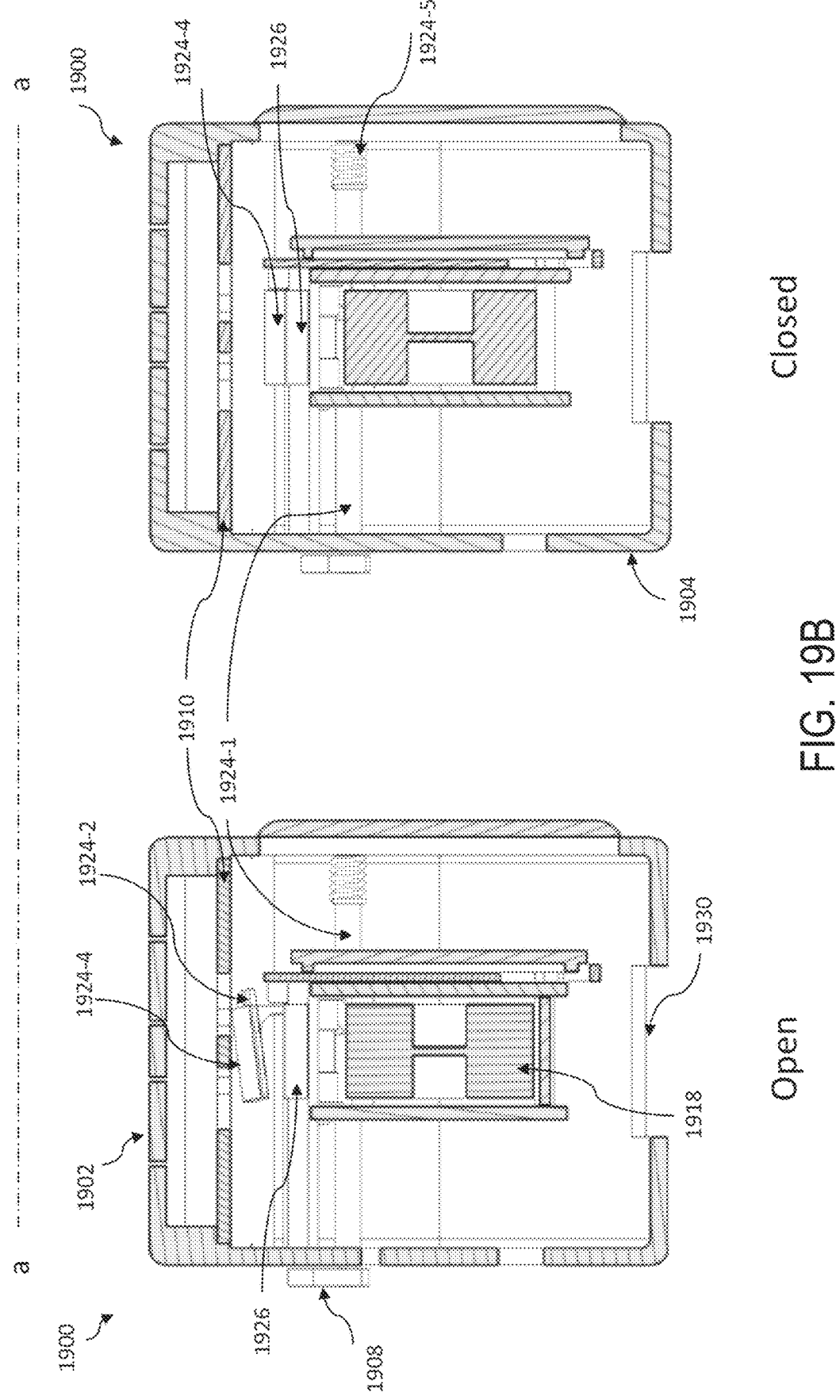

FIGS. 19A and 19B illustrate cross-sectional views of an example device 1900. FIG. 19A depicts a cross-sectional front view (along b-b axis as shown in FIG. 12) of a tape medium cutting process and FIG. 19B depicts a cross-sectional side view (along a-a axis as shown in FIG. 12) of the process. Both views shown in FIGS. 19A and 19B are of the same states-before cutting (i.e., open) on the left and after cutting (i.e., closed) on the right. In the example implementation shown, cutting switch 1908, cutting arm shaft 1924-1, cutting arm snap lock 1924-2, cutting arm torsion bar 1924-3, and cutting arm moving blade 1924-4 may be configured as single assembly, which is held in its open position by the cutting arm return spring 1924-5. The cutting arm torsion bar 1924-3 may be configured so that the cutting arm moving blade 1924-4 is held at 10 degrees from horizontal. In another examples, the cutting arm torsion bar 1924-3 may be configured so that the cutting arm moving blade 1924-4 is held at a continuous range of angles relative to the horizontal, where the angle may have a range of up to 45 degrees. In other examples, the angle of the cutting arm moving blade 1924-4 may be held at angles up to 5 degrees, up to 12.5 degrees, or up to 20 degrees from horizontal.

In order to cut the tape medium 1918 that passes over the fixed blade 1926 of the cutting anvil 1938, the cutting switch 1908 needs to be actuated or turned to overcome the cutting arm return spring 1924-5. The actuation or turning of the cutting switch 1908 rotates the cutting arm shaft 1924-1 and moves the cutting arm moving blade 1924-4 down towards the fixed blade 1926 of the cutting anvil 1938. When the cutting arm torsion bar 1924-3 contacts the cutting anvil 1938 (which may be fixed to the housing 1904), the cutting arm torsion bar 1924-3 begins to twist and the cutting arm moving blade 1924-4 is rotated towards parallel with the fixed blade 1926. The collision between the cutting arm moving blade 1924-4 and fixed blade 1926 creates a scissor-like cutting action as the two blades (1924-4 and 1926) intersect. Upon completion of the cut, the cutting arm torsion bar 1924-3 is held flat against the cutting anvil 1938 by the cutting arm snap lock 1924-2. With the entire cutting arm 1924 held in place, the end of the tape medium 1918 connected to the unspooled roll of tape medium 1918 is held in place and the roll of tape medium 1918 is ready to be unspooled by the gross indexing wheel knob 1228 (shown in FIG. 12). To release cutting arm snap lock 1924-2, the protruding release element 1906-4 of the indexing swing arm 1906 pushes the cutting arm snap lock 1924-2 open before the swing arm element 1906-3 of the indexing swing arm 1906 rotates around to pick up the held end of the tape medium 1918 again. Further, because the adhesive side of the tape medium 1918 is away from the center of the device 1900, the tape medium 1918 will stick to the cutting arm torsion bar 1924-3. When the cutting arm 1924 releases, the cutting arm 1924 lifts the end of the tape medium 1918 and causes the tape medium 1918 to intersect with the path of the indexing swing arm 1906.

Further modifications of the invention will also occur to persons skilled in the art, and all such are deemed to fall within the spirit and scope of the invention as defined by the appended claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements. It should also be understood that the terms coupled to or adjacent to could include intervening components.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A user input device, comprising:
a housing that includes a tape exit port;
an embossing arm structure, comprising at least six embossing arms, within the housing, and wherein each embossing arm tapers to an embossing arm tip, and wherein the embossing arm tips of the at least six embossing arms form a grid of at least six tips;
an embossing anvil, within the housing, wherein the embossing arm tips align with concave features arranged in a grid on the embossing anvil;
a tape advancing structure to advance a tape medium; and
a tape medium cutting assembly disposed within the housing for cutting the tape medium, wherein the cutting assembly comprises a cutting anvil mounted in the housing, a cutting arm configured to include a blade oriented at an angle relative to the cutting anvil, and a cutting switch actuatable to rotate the cutting arm towards the cutting anvil to cut the tape medium;
where the housing further comprises a top cap comprising a plurality of flexural button arms oriented such that each of the flexural button arms project radially toward other of the flexural button arms and the center of the-top cap.

2. The user input device of claim 1, further comprising a mechanism disposed between the flexural button arms and embossing arms to generate at least one of an auditory or tactile cue in response to force applied to a flexural button arm.

3. The user input device of claim 1 further comprising an indexing wheel configured to couple the tape handling structure to the housing and operable to rotate the tape handling structure, where the indexing wheel is accessible from outside of the housing.

4. The user input device of claim 1, further comprising a cutting surface disposed on an edge of the tape exit port for cutting the tape medium.

5. The user input device of claim 1, the housing further comprising a plurality of flexural button arms on a top surface, the tape exit port on a bottom surface, and an indexing wheel accessible on a side surface.

* * * * *